US012781451B2

(12) United States Patent
Beekman

(10) Patent No.: US 12,781,451 B2
(45) Date of Patent: Nov. 3, 2026

(54) HYDRAULICALLY-POWERED VACUUM SYSTEM

(71) Applicant: Jeremy Beekman, Pennock, MN (US)

(72) Inventor: Jeremy Beekman, Pennock, MN (US)

( * ) Notice: Subject to any disclaimer, the term of this patent is extended or adjusted under 35 U.S.C. 154(b) by 81 days.

(21) Appl. No.: 18/261,800

(22) PCT Filed: Jan. 19, 2022

(86) PCT No.: PCT/US2022/070248

§ 371 (c)(1),
(2) Date: Jul. 17, 2023

(87) PCT Pub. No.: WO2022/159945

PCT Pub. Date: Jul. 28, 2022

(65) Prior Publication Data

US 2024/0076843 A1 Mar. 7, 2024

Related U.S. Application Data

(60) Provisional application No. 63/199,710, filed on Jan. 19, 2021.

(51) Int. Cl.
*F15B 7/00* (2006.01)
*E01H 1/08* (2006.01)
*E01H 15/00* (2006.01)

(52) U.S. Cl.
CPC ........... *E01H 1/0836* (2013.01); *E01H 15/00* (2013.01); *F15B 7/008* (2013.01); *F15B 2211/41563* (2013.01); *F15B 2211/8609* (2013.01)

(58) Field of Classification Search
CPC ................ F15B 7/00; F15B 2211/8609; F15B 2211/41563; F15B 61/4043
See application file for complete search history.

(56) References Cited

U.S. PATENT DOCUMENTS

| | | | | | |
|---|---|---|---|---|---|
| 4,141,128 | A * | 2/1979 | Wonderling | ............ | B23P 15/00 55/379 |
| 4,767,162 | A * | 8/1988 | Reed, III | ............ | E01C 23/0933 299/1.5 |

(Continued)

FOREIGN PATENT DOCUMENTS

| | | | | |
|---|---|---|---|---|
| EP | 0227547 | A2 * | 7/1987 | ......... F16H 61/4035 |
| GB | 978842 | A | 12/1964 | |
| WO | WO-2022159945 | A1 | 7/2022 | |

OTHER PUBLICATIONS

"International Application Serial No. PCT US2022 070248, International Preliminary Report on Patentability mailed Aug. 3, 2023", 9 pgs.

(Continued)

*Primary Examiner* — Nathaniel E Wiehe
*Assistant Examiner* — Daniel S Collins
(74) *Attorney, Agent, or Firm* — Schwegman Lundberg & Woessner, P.A.

(57) ABSTRACT

A hydraulic implement, which may be configured for attachment to a hydraulic system having a pressure line and a return line, may include a motor, an anti-cavitation valve, and an adjustable flow control valve. The motor may be operably connected between the pressure line and the return line and to rotate a shaft when hydraulic fluid flows from the pressure line through the motor to the return line. The anti-cavitation valve may be connected in parallel across the motor between the pressure line and the return line. The adjustable flow control valve may be connected in parallel across the motor between the pressure line and the return line. A method may include causing fluid to flow from the pressure line through an open adjustable flow control valve to the return line; and at least partially closing the valve to divert at least some fluid flow through the motor.

20 Claims, 20 Drawing Sheets

(56) References Cited

U.S. PATENT DOCUMENTS

| | | | | |
|---|---|---|---|---|
| 4,788,821 | A * | 12/1988 | Mienko | F15B 7/005 60/572 |
| 6,422,804 | B1 | 7/2002 | Gitter | |
| 7,415,748 | B1 * | 8/2008 | Guhr | E02F 3/3604 15/340.1 |
| 2004/0060290 | A1 * | 4/2004 | Stahlman | F04B 17/06 60/456 |
| 2009/0070954 | A1 * | 3/2009 | Torno | E01H 1/0854 15/340.1 |
| 2015/0240940 | A1 | 8/2015 | Schmidt et al. | |

OTHER PUBLICATIONS

"European Application Serial No. 22743410.7, Response to Communication pursuant to Rules 161(1) and 162 EPC filed Feb. 9, 2024", 12 pgs.

"Industrial filter bags sizes and chart", Filter Workshop, Web, [Online] Retrieved from the internet: <https://filterworkshop.com/article/industrial-filter-bags-sizes-and-chart-i00321i1.html>, (Feb. 1, 2018).

"International Application Serial No. PCT/US2022/070248, International Search Report mailed Jun. 1, 2022", 4 pgs.

"International Application Serial No. PCT/US2022/070248, Invitation to Pay Additional Fees mailed Mar. 21, 2022", 3 pgs.

"International Application Serial No. PCT/US2022/070248, Written Opinion mailed Jun. 1, 2022", 7 pgs.

"European Application Serial No. 22743410.7, Extended European Search Report mailed Feb. 10, 2025", 10 pages.

"European Application Serial No. 22743410.7, Communication pursuant to Rule 164(1) EPC mailed Nov. 20, 2024", 11 pgs.

"European Application Serial No. 22743410.7, Response filed Aug. 25, 2025 to Extended European Search Report mailed Feb. 10, 2025", W/ English Claims, 23 pgs.

* cited by examiner

HYDRAULICALLY-POWERED VACUUM SYSTEM

CLAIM OF PRIORITY

This application is a U.S. national stage filing under 35 U.S.C. § 371 from International Application No. PCT/US2022/070248, filed on Jan. 19, 2022, and published as WO 2022/159945 on Jul. 28, 2022, which claims the benefit of U.S. Provisional Application No. 63/199,710, filed on Jan. 19, 2021, the benefit of priority of each of which is claimed herein, and which is applications and publication are hereby incorporated by reference herein in its their entirety.

TECHNICAL FIELD

This document relates generally to hydraulic systems, and more particularly, but not by way of limitation, to systems, devices, and methods for hydraulically powering a high speed motor such as may be used in a hydraulically-powered vacuum system.

BACKGROUND

Hydraulic systems can be an efficient way and relatively simple and economic way to generate and control power to a motor. By way of example, skid steers hydraulically power a variety of attachments through their auxiliary hydraulic system.

Some principles of a hydraulic system are that the hydraulic fluid is not compressed, pressure is created in the hydraulic system only by resisting hydraulic fluid flow, and energy created under pressure will either provide work or heat. Hydraulic pumps cause fluid to flow but they do not create pressure as pressure is the result of a restriction to flow. A hydraulic system has at least one positive-displacement pump that may have either a fixed-displacement or a variable-displacement. A fixed-displacement pump moves the same volume of hydraulic oil with each cycle. Only the speed of the fixed-displacement pump modifies the output. A variable-displacement pump can alter the volume it moves with each cycle even if the operating speed stays the same. Variable-displacement pumps may be employed in applications where a specific pressure or flow must be maintained.

The use of hydraulic systems to operate high speed motors has some challenges. For example, some hydraulic pumps used in some skid steer models are designed with a pressure compensator (e.g., a variable-displacement pump) to reduce pump flow if system pressure rises above a pre-set maximum pressure. Pressure compensators may be used where one pump supplies several branch circuits and full pressure may be needed in the branches. A significant challenge encountered when a hydraulic pressure line from a pressure-compensated pump is connected to power a high-speed motor is that high-pressure spikes or pressure surges may occur when a control valve is opened to provide fluid flow to the high-speed motor. This may pose a significant problem for one-person operation of the system. For example, one operator of the skid steer may turn on the auxiliary hydraulic system, and then leaves the seat to operate a hydraulically-powered implement (e.g., attachment) with a high-speed motor from the ground. The operator on the ground is unable to control the engine speed to control the pressure in the hydraulic line connected to the high-speed motor. If the operator opens a conventional, series-connected control valve to allow fluid to flow to the motor, the pressure may rise causing the pressure compensator to react in a manner that causes the repeated pressures surges. Also, when the series-connected control valve is closed, the pressure may be relieved via a pressure release valve which wastes energy and generates undesired heating in the system. Additionally, shutting the series-connected control valve can also cause problems such as cavitation when the high-speed motor continues to rotate even after the control valve is shut.

There are needs to improve systems, such as vacuum systems, powered by high-speed hydraulic motors.

SUMMARY

An example (e.g. "Example 1") of a system may include a hydraulic implement, which may be configured for attachment to a hydraulic system having a pressure line and a return line. The hydraulic implement may include a motor, an anti-cavitation valve, and an adjustable flow control valve. The motor may be operably connected between the pressure line and the return line and to rotate a shaft when hydraulic fluid flows from the pressure line through the motor to the return line. The anti-cavitation valve may be connected in parallel across the motor between the pressure line and the return line. The adjustable flow control valve may be connected in parallel across the motor between the pressure line and the return line.

In Example 2, the subject matter of Example 1 may optionally be configured such that the implement includes a fluid connection between the motor and a case drain line of the hydraulic system.

In Example 3, the subject matter of any one or more of Examples 1-2 optionally further includes a quick attachment plate for connection to a machine, such as a skid steer, that includes the hydraulic system. In Example 4, the subject matter of any one or any combination of Examples 1-3 may optionally be configured such that the motor is a high speed bent axis piston hydraulic motor drive.

In Example 5, the subject matter of any one or any combination of Examples 1-3 may optionally be configured such that the implement includes a blower, where the motor is operably connected to the blower.

In Example 6, the subject matter of Example 5 may optionally be configured such that the hydraulic implement is configured to operate as a vacuum system. The hydraulic implement may further include a vacuum receiving hopper, and the blower may be operatively connected to the vacuum receiving hopper to draw a vacuum in the vacuum receiving hopper.

In Example 7, the subject matter of Example 6 may optionally be configured such that the hydraulic implement includes tubing connected to the blower and configured for the blower to draw the vacuum through a top of the vacuum receiving hopper.

In Example 8, the subject matter of Example 7 may optionally be configured such that the subject matter further comprises a baghouse filtration system connected to the top of the vacuum receiving hopper. The blower and tubing may be configured to draw the vacuum from the top of the vacuum receiving hopper through the baghouse filtration system, and the baghouse filtration system may be configured to filter dust and debris from returning with air being drawn through the tubing to the blower.

In Example 9, the subject matter of Example 8 may optionally be configured such that the baghouse filtration includes a plurality of filters. Each of the filters may include a filter bag and a spring (or other flexible frame) within the filter bag to generally maintain a shape of the filter during operation.

In Example 10, the subject matter of Example 9 may optionally be configured such that each of the plurality of filters has a neck. The baghouse filtration may include a filter plate having a plurality of apertures configured to receive the plurality of filters, respectively. Each of the plurality of filters may be held in the plate at the neck of the filter. Air may be drawn through the plurality of filters in the plurality of apertures through the tubing to the blower. The neck may be formed by a head having two portions.

In Example 11, the subject matter of Example 10 may optionally be configured such that each of the plurality of filter bags has a diameter of about 2 inches and a length of about 15 inches.

An example (e.g., "Example 12") of a method may include operating a hydraulic implement that is attached to a hydraulic system having a pressure line and a return line, where the hydraulic implement includes a motor operably connected between the pressure line and the return line and to operate to rotate a shaft when hydraulic fluid flows from the pressure line through the motor to the return line, an anti-cavitation valve connected in parallel across the motor between the pressure line and the return line, and an adjustable flow control valve connected in parallel across the motor between the pressure line and the return line. The method may include engaging the hydraulic system to cause fluid to flow from the pressure line through an open adjustable flow control valve to the return line, and at least partially closing the adjustable flow control valve to divert at least some hydraulic fluid flow from the pressure line through the motor to the return line.

In Example 13, the subject matter of Example 12 may optionally include, after at least partially closing the adjust control valve, fully closing the adjustable flow control valve to divert all fluid flow from the pressure line through the motor to the return line.

In Example 14, the subject matter of Example 13 may optionally include stopping the motor from rotating by reopening the adjustable flow control valve to cause fluid to bypass the motor flowing from the pressure line to the return line. Fluid may flow from the return line through the anti-cavitation valve to the pressure line when the motor coasts to a stop after the adjustable flow control valve is opened.

An example (e.g., "Example 15") of a system may include a vacuum system. The vacuum system may be configured to be attached to a machine with articulated arms that are configured to lift and tip the vacuum system. The vacuum system may include a vacuum hopper. The vacuum hopper may include a bottom, a back plate, opposing side plates, a front plate, a top plate, and a hinged top lid. The back plate may be rigidly connected to the bottom. The opposing side plates may be rigidly connected to the bottom and the back plate. The opposing side plates being substantially parallel to each other and substantially perpendicular to the back plate. The front plate may be rigidly connected to the bottom and the opposing side plates. Eof the opposing side plates may have a top edge and a bottom edge. The top edge may be longer than the bottom edge such that front plate forms an incline. The top plate may be rigidly connected to the back plate and to rearward portions of the opposing side plates. The hinged top lid may have a hinged connection to the top plate and be configured to be closed onto and form a seal with the front plate and forward portions of the opposing side plates. The vacuum system may further include a quick attachment plate attached to the back plate, a filtration system, and a blower and vacuum tubing. The quick attachment plate may be configured for use to attach the vacuum hopper to the machine with articulated arms. The filtration system may be attached to the top plate. The blower and vacuum tubing may be connected between the filtration system and the blower, and may be configured to draw air from an interior of vacuum tubing through the filtration system, through air return tubing, and to the blower.

In Example 16, the subject matter of Example 15 may optionally be configured such that the blower is powered using a hydraulic motor.

In Example 17, the subject matter of any one or more of Examples 15-16 may optionally further include a muffler connected to the blower via exhaust tubing, wherein the blower exhausts air through the muffler.

In Example 18, the subject matter of any one or more of Examples 15-17 may optionally be configured such that the filtration system may include a filtration housing and a filtration plate having edges that form a seal with the filtration housing. The filtration plate may include a plurality of apertures through which the blower draws air to create the vacuum in the vacuum hopper.

In Example 19, the subject matter of any one or more of Examples 15-18 may optionally be configured such that the filtration system may include a plurality of filters, where each of the filters include a filter bag and a spring within the filter bag to generally maintain a shape of the filter during operation.

An example (e.g., "Example 20") of a system may include a vacuum system. The vacuum system may be configured to be attached to a machine with articulated arms that are configured to lift and tip the vacuum system. The vacuum system may include a vacuum hopper, a quick attachment plate, a filtration system, a blower and vacuum tubing. The quick attachment plate may be attached to the hopper and may be configured for use to attach the vacuum hopper to the machine with articulated arms. The filtration system may be attached to the top plate. The filtration system may include a filtration housing, a filtration plate, and a plurality of filters. The filtration plate may have edges that form a seal with the filtration housing. The filtration plate may include a plurality of apertures through which the blower draws air to create the vacuum in the vacuum hopper. Each of the filters may include a filter bag and a flexible frame within the filter bag to generally maintain a shape of the filter during operation. The blower and vacuum tubing may be connected between the filtration system and the blower and configured to draw air from an interior of vacuum tubing through the filtration system, through air return tubing, and to the blower.

In Example 21, the subject matter of Example 20 may optionally be configured such that the flexible frame includes a spring.

In Example 22, the subject matter of any one or more of Examples 20-21 may optionally be configured such that each of the plurality of filters have a neck for use to securely attach the plurality of filters to the plurality of apertures in the filtration plate.

In Example 23, the subject matter of any one or more of Examples 20-22 may optionally be configured such that each of the plurality of filters include a filter head. Each filter head may include two filter head pieces configured to attach to each other, via a threaded connection, through the aperture and to secure the filter head to the filtration plate. Each of the filter head pieces may have a central opening through which air is drawn into the return tubing. The spring may be attached to one of the filter head pieces.

In Example 24, the subject matter of any one or more of Examples 20-22 may optionally be configured such that each of the plurality of filters has a generally elongated shape hanging down from the filtration plate.

In Example 25, the subject matter of any one or more of Examples 20-24 may optionally be configured such that the filters are configured and arranged to rub against each other when the machine lifts and tips the vacuum system to thereby knock debris off of the filters during operation.

In Example 26, the subject matter of any one or more of Examples 20-25 may optionally be configured such that the filters are arranged in an array of columns and rows.

In Example 27, the subject matter of any one or more of Examples 20-26 may optionally be configured such that each of the plurality of filter bags has a diameter of about 2 inches and a length of about 15 inches.

In Example 28, the subject matter of any one or more of Examples 20-27 may optionally be configured such that the plurality of filters include fabric treated to repel oil and water.

An example (e.g., "Example 29") of a hydraulic manifold may be configured to be attached between a hydraulic source and a hydraulic motor. The manifold may include a metal block having six sides and having a height, a length and a width, wherein the width is less than the height and is less than the length. Opposing top and bottom surfaces have dimensions corresponding to the width and the length. Opposing face surfaces have dimensions corresponding to the length and the height. Opposing side surfaces have dimensions corresponding to the width and the height. A hydraulic input orifice and a hydraulic output orifice may be in one of the opposing side surfaces, wherein the hydraulic input orifice is configured to be connected to a pressure hydraulic line hose and the hydraulic output orifice is configured to be connected to a return hydraulic line hose. A motor input orifice and a motor output orifice may be in one of the opposing face surfaces and configured to be in fluid communication with the hydraulic motor when the metal block is mounted to the motor. The metal block may include hydraulic passages including an input passage extending at least from the hydraulic input orifice to the motor input orifice, and an output passage extending at least from the hydraulic output orifice to the motor output orifice, a bypass passage extending between the input passage and the output passage, and an anti-cavitation passage extending between the input passage and the output passage. A control valve may be positioned within the bypass passage and be configured to be opened to enable fluid flow through the bypass passage and to be closed to prevent fluid flow through the bypass passage. An anti-cavitation valve may be positioned within the anti-cavitation passage and configured to allow fluid flow from the output passage to the input passage when pressure within the output passage is over a threshold above pressure within the input passage.

In Example 30, the subject matter of Example 29 may optionally be configured such that the metal block is formed with a pattern of mounting apertures extending between the opposing face surfaces, wherein the pattern of mounting apertures is configured to receive fasteners to mount the metal block to the hydraulic motor.

In Example 31, the subject matter of any one or more of Examples 29-30 may optionally be configured such that the input passage is parallel to the output passage, the bypass passage is parallel to the anti-cavitation passage, and the bypass and anti-cavitation passages are perpendicular to the input and output passages.

In Example 32, the subject matter of any one or more of Examples 29-31 may optionally be configured such that the input orifice includes a flow restriction orifice, and the flow restriction orifice is sized to limit fluid flow to the hydraulic motor to be less than a maximum fluid flow rating of hydraulic motor or limit fluid flow to limit a maximum operating speed for a component to be driven by the hydraulic motor.

In Example 33, the subject matter of any one or more of Examples 29-32 may optionally be configured such that the metal block is an aluminum block.

In Example 34, the subject matter of any one or more of Examples 29-33 may optionally be configured such that the bypass and anti-cavitation passages are on different sides of the motor input and motor output orifices.

In Example 35, the subject matter of any one or more of Examples 29-34 may optionally be configured such that the control valve is configured to be manually operated using a knob attached to the control valve, wherein the knob is positioned over the top surface.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to “an”, “one”, or “various” embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
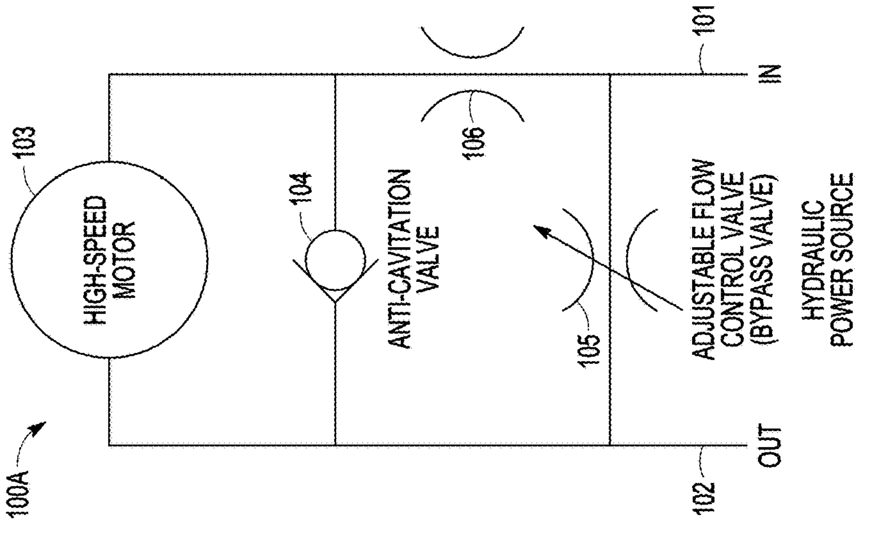
FIGS. 1A-1C illustrate, by way of example and not limitation, embodiments of hydraulic circuits used to power high-speed motors.
Figure 1B:
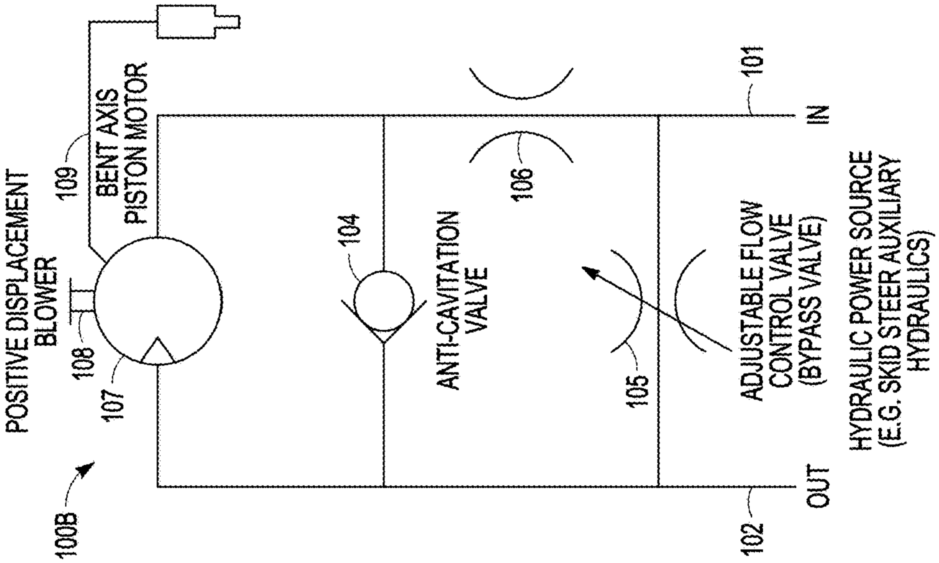
Figure 1C:
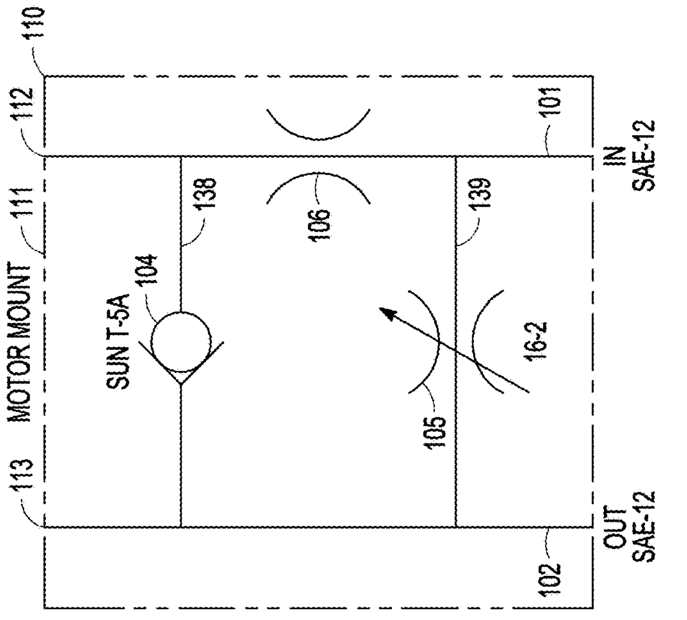

FIGS. 1A-1C illustrate, by way of example and not limitation, embodiments of hydraulic circuits used to power high-speed motors. For example, the hydraulic circuit 100A (FIG. 1A) may be included in a hydraulic implement for attachment to a hydraulic system having an input or a pressure line 101 and an output or return line 102. The hydraulic implement may include a motor 103, such as a high-speed motor, operably connected between the pressure line 101 and the return line 102 and to rotate a shaft when hydraulic fluid flows from the pressure line 101 through the motor 103 to the return line 102. The hydraulic circuit may further include an anti-cavitation valve 104 (via an anti-cavitation hydraulic fluid passage 139) connected in parallel across the motor 103 between the pressure line 101 and the return line 102, an adjustable flow control valve 105 connected in parallel across the motor 103 (via a bypass hydraulic fluid passage 138) between the pressure line 101 and the return line 102, and a flow restriction orifice 106 configured and arranged to limit a maximum hydraulic flow rate to the high-speed motor. The flow restriction orifice 106 may be sized to prevent the hydraulic flow rate from exceeding the flow rate rating for a given hydraulic motor. The flow restriction orifice 106 may be sized to limit fluid flow to limit a maximum operating speed for a component to be driven by the hydraulic motor. Thus, the flow restriction orifice 106 may be designed to limit a blower driven by the hydraulic motor from exceeding an RPM threshold. In a more specific embodiment where the hydraulic system includes a vacuum source, the motor may be a high-speed bent axis piston hydraulic motor 107 connected to drive a positive-displacement blower 108, as is generally illustrated in hydraulic circuit 100B (FIG. 1B). The hydraulic motor displacement and positive displacement blower may be appropriately sized and configured for skid steer size and model. The hydraulic circuit 100B may include a fluid connection 109 between the motor 106 and a case drain line of the hydraulic system. High speed motors may release case pressure on the motor to the low-pressure return (reservoir) via the case drain. This protects the shaft seal. The implement (e.g., vacuum system) may be hydraulically powered such as, by way of example, using auxiliary hydraulics from a skid steer. FIG. 1C illustrates a schematic of a portion of the hydraulic circuit within a manifold 110. By way of example, the manifold may have a generally rectilinear, cuboid or block-like shape, containing the anti-cavitation valve 104, the adjustable control valve 105, the flow restriction orifice 106, and hydraulic fluid passageways (see also FIGS. 12A-12F, 13A-13B, 14, 15A-15B). The illustrated manifold 110 includes a motor mount 111 for use to mount the manifold to the motor, and further includes a motor input 112 opening through which hydraulic fluid flows to the motor, and a motor output 113 opening through which hydraulic fluid returns from the motor.

The hydraulic circuit illustrated in FIGS. 1A-1C functions as a custom-designed, high-speed ramping circuit that enables the motor 106 to ramp up to its high operating speed and ramp down or coast to a stop. Notably, the adjustable flow control valve 105 bypasses the motor (when open) such that fluid flows from the pressure line through the adjustable flow control valve 105 and the bypass hydraulic fluid passage 138 to the hydraulic tank. The motor 103 is off when the valve is open since all of the hydraulic fluid flow bypasses the motor via the adjustable flow control valve 105 and the bypass hydraulic fluid passage 138. The motor 103 is on when the adjustable flow control valve 105 is completely closed and all of hydraulic fluid goes through the motor 105. The adjustable flow control valve 105 may be partially closed to direct some hydraulic fluid to the motor 103 and the rest through the bypass to the hydraulic tank.

Conventional series-connected control valves may be pressure-compensating priority flow valves. The conventional, series-connected pressure compensating priority flow control valve adversely reacts with the skid steers that have pressure compensating pumps. Such hydraulic systems have two pressure compensators (the skid steer’s pump and the compensating priority flow control) that fight each other, which may result in the system surges with a 1000 psi (pounds per square inch) swing (e.g., approximately 6900 kPa swing). The surges in hydraulic pressure cause the positive displacement blower to constantly surge. Further, conventional series-connected control valves are less efficient. As most skid steers do not have a load sense pump, a series-connected flow control will consume the same horse power from the skid steer regardless of whether the hydraulic fluid is flowing at 1 gallon per minute (e.g., approximately 4.5 liter per minute) or 30 gallons per minute (e.g., approximately 136 liter per minute). The gear pump from the skid steer provides a fixed hydraulic fluid flow rate depending on engine speed. For example, a skid steer may be designed to provide 30 gallons per minute (gpm) (e.g., approximately 136 liter per minute). If one only needed 5 gallons per minute (e.g., approximately 22.7 liter per minute) from the skid steer to run a blower at slower speeds, a priority flow control could send 5 gallons per minute (22.7 liters per minute) to the blower motor and 25 gallons per minute (113.7 liters per minute) back to the skid steer. Note that the Horse Power (HP) consumed is given by Equation 1.

$$\text{Hydraulic HP}=\text{gpm}\times\text{psi}/1714. \qquad (1)$$

If the pressure is 3000 psi, then the required horse power equals 5 gpm×3000 psi/1714 or 8.75 HP. Unless the engine speed of the skid steer is idled, the skid steer sends 30 gpm even if only 5 gpm is needed. The other unused 25 gpm are additive (e.g. 5 gpm+25 gpm) because it is in series. The engine is still using 52 HP (30 gpm×3000 psi/1714). Thus, the conventional series-connected control valve basically wastes 40 HP in heat. Most skid steers may have hydraulic coolers to compensate for this heat.

In contrast, a partially-shut parallel bypass control valve 105 in the hydraulic circuits illustrated in FIGS. 1A-1C may allow 5 gpm to flow to the motor and sends the other 25 gpm back to the tank, which only uses 8.75 HP (5 gpm to the motor×3000 psi/1714). Thus, the present subject matter provides a more-efficient system for ramping up speed as it wastes less power.

The hydraulic circuit may be useful to power anything with a high-speed engine such as, but not limited to, an electric generator, a pressure washer, an air compressor, a transfer pump or a blower/vacuum system. The hydraulic design, for attachment to a skid steer hydraulic system, may be used to replace a 30 to 50 HP engine.

One operator may operate the hydraulic implement while standing next to the running skid steer. Notably, the operator does not need to be on the skid steer to adjust the engine speed of the skid steer. The hydraulic system is engaged to cause fluid to flow from the pressure line 101 through an open adjustable flow control valve 105 to the return line 102. The adjustable flow control valve 105 is at least partially closed to divert at least some hydraulic fluid flow from the pressure line 101 through the motor 106 to the return line 102. The adjustable flow control valve 105 may be fully closed to divert all fluid flow from the pressure line 101 through the motor 106 to the return line 102. The motor 106 may be stopped by reopening the adjustable flow control valve 105 to cause fluid to bypass the motor 106. Fluid flows from the return line 102 through the anti-cavitation valve 104 via the anti-cavitation hydraulic fluid passage 139 to the pressure line 101 when the motor coasts to a stop after the valve 105 is opened.

Figure 2A:
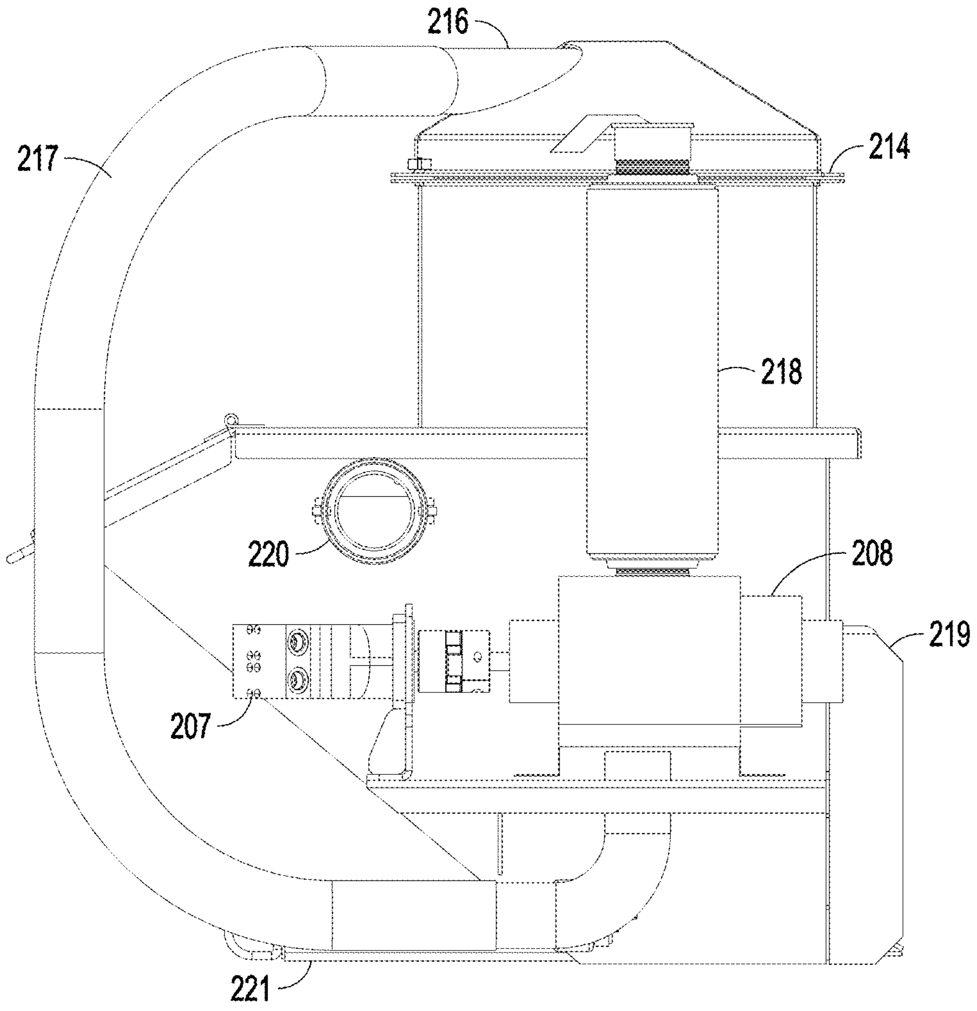
FIGS. 2A-2C illustrate, by way of example and not limitation, various views of an embodiment of a hydraulically-powered vacuum system.
Figure 2B:
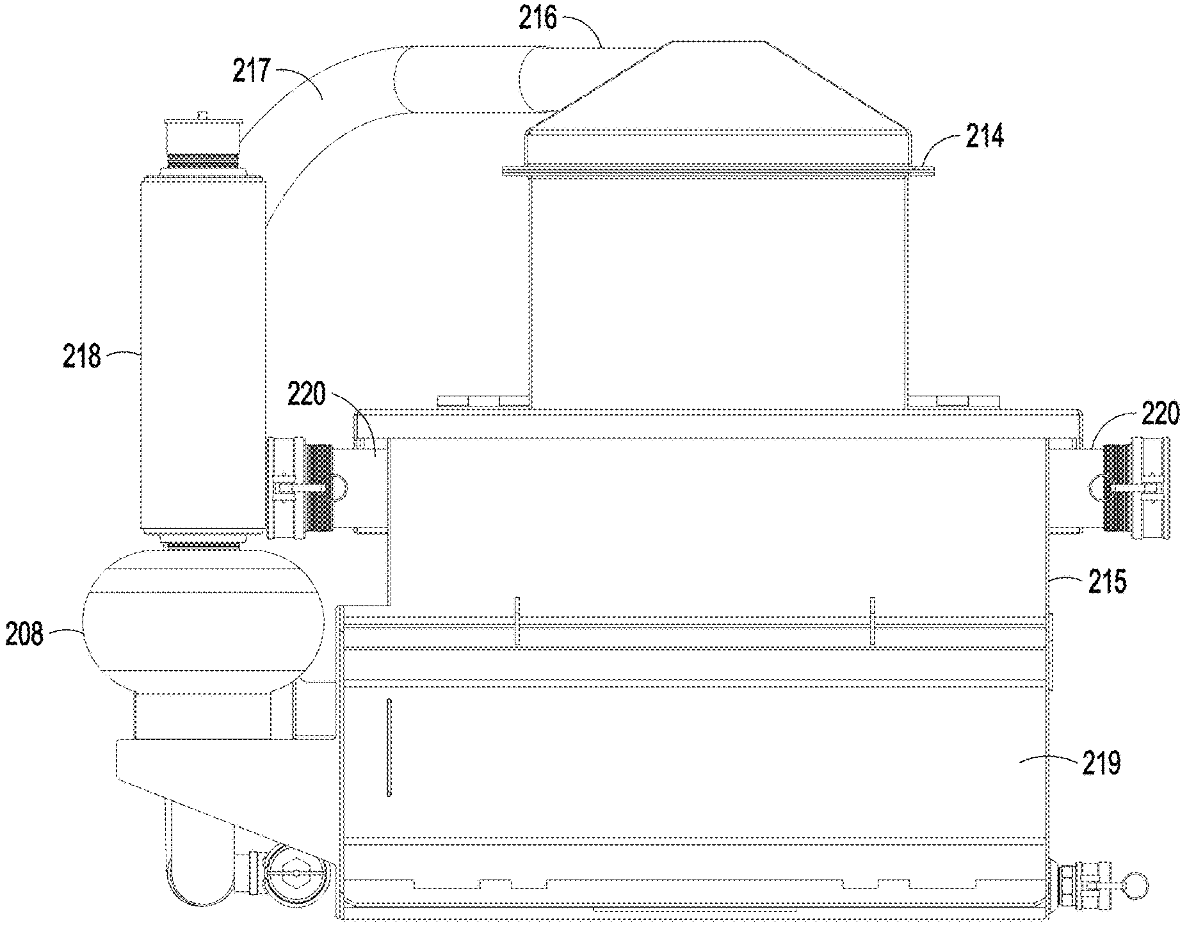
Figure 2C:
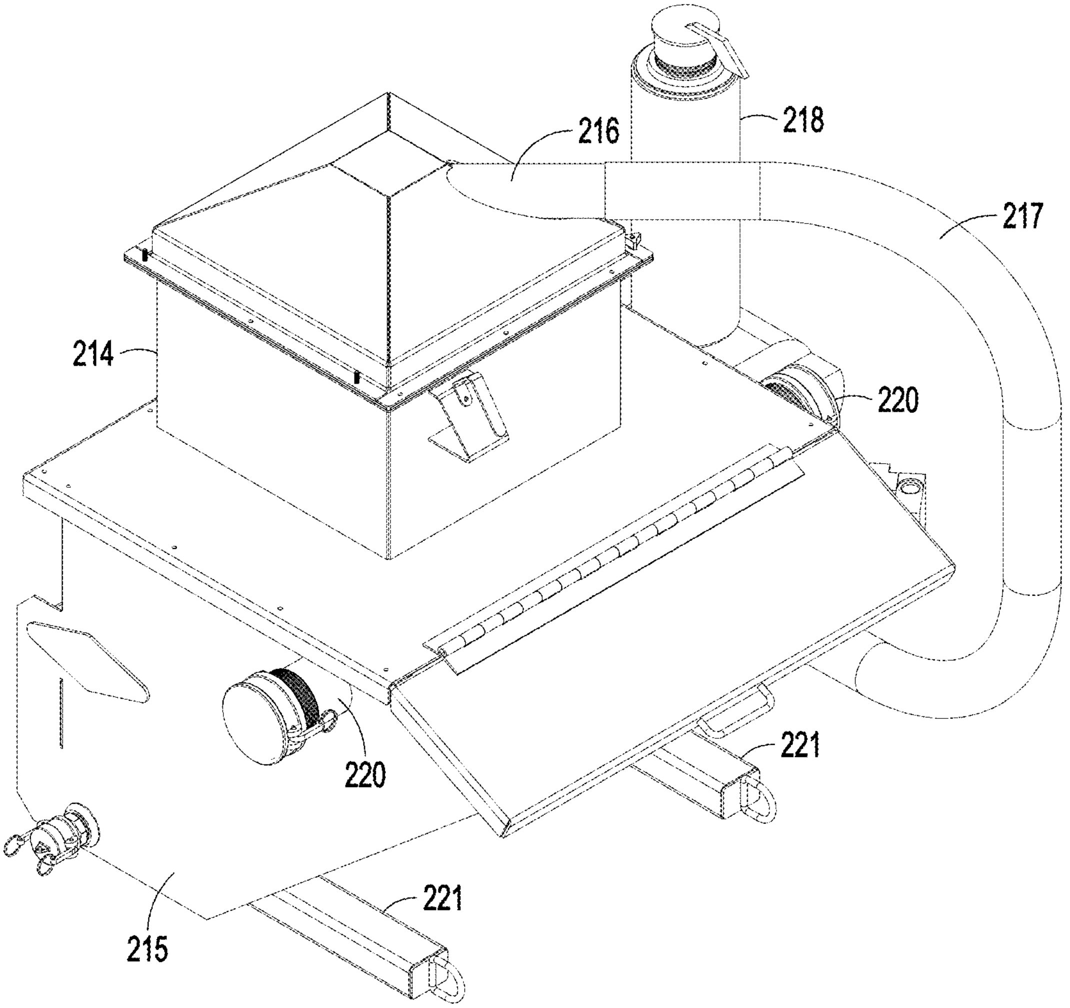

FIGS. 2A-2C illustrate, by way of example and not limitation, various views of an embodiment of a hydraulically-powered vacuum system. The system includes a high-speed bent-axis piston motor 207 operatively connected to a positive-displacement blower 208. The system may include a baghouse filtration system 214 connected to the top of the vacuum receiving hopper 215, and an exhaust 216 on top of the baghouse filtration system 214. Vacuum tubing 217 extends from the exhaust 216 to the blower 208. The air blowing out from the blower 208 exits through the muffler 218, which reduces noise level during operation. The baghouse filtration includes a plurality of filters, illustrated in FIGS. 13A-13D. The blower 208 draws a vacuum in the vacuum receiving hopper 215 by drawing air from the hopper 215, through the baghouse filtration system 214, exhaust 216 and vacuum tubing 217. A quick attachment plate 219 may be attached to the hopper 215 and configured to enable a machine with articulated arms, such as a skid steer, to make a quick attachment to the vacuum receiving hopper 215. The attachment plate 219 may be universal quick attachment plate common to most skid steer manufacturers. The attachment plate 219 could also be adapted to attach to other type of skid steers or made to attach to a payloader, wheel loader or telehandler. A vacuum nozzle tube (not shown) may be attached to an opening 220 in the hopper 215. FIGS. 2A-2C illustrate legs 221 to allow the hopper 215 stand on the ground.

Figure 3:
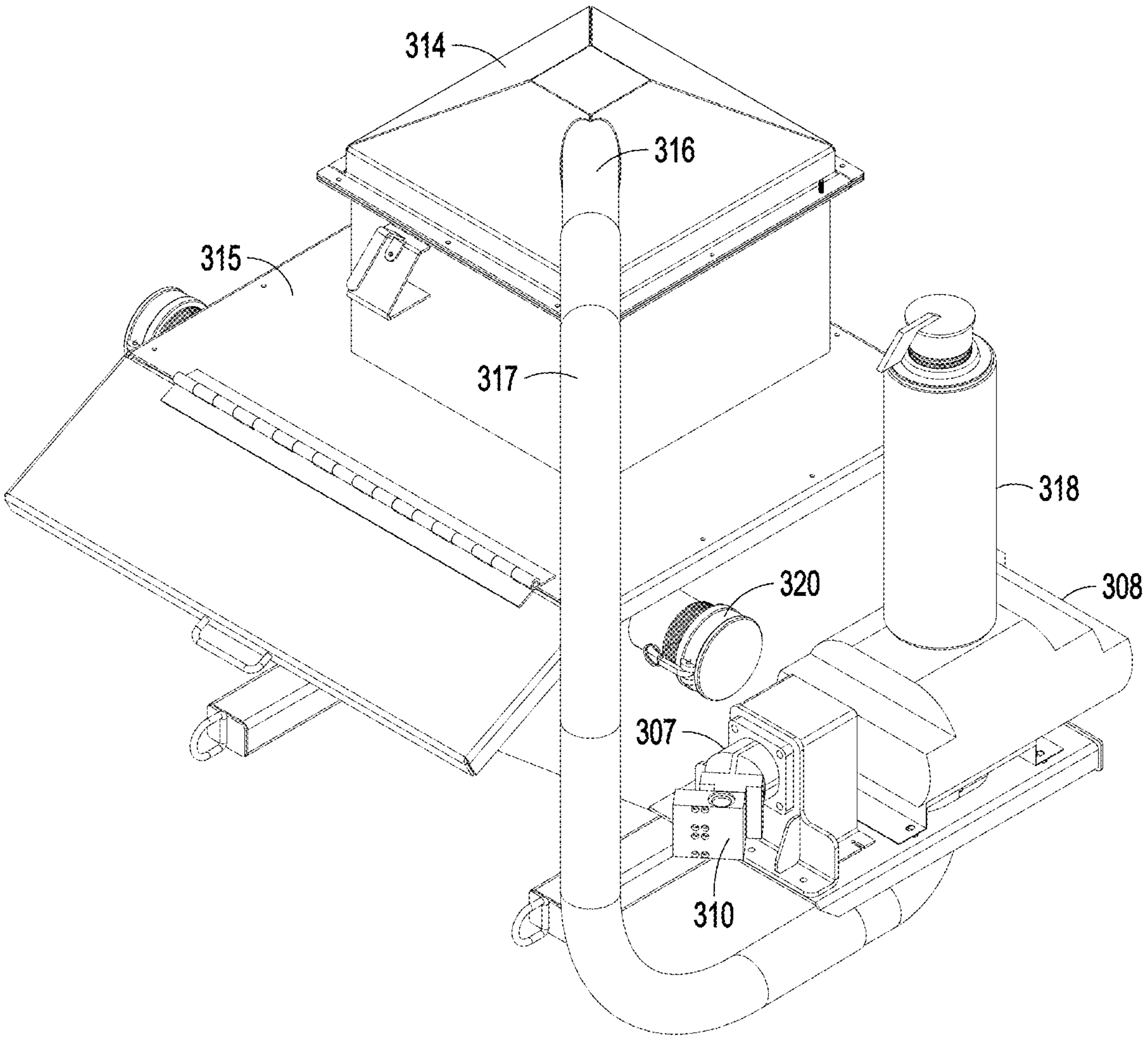
FIG. 3 illustrates, by way of example and not limitation, a perspective view of the embodiment of the hydraulically-powered vacuum system illustrated in FIGS. 2A-2C.

FIG. 3 illustrates, by way of example and not limitation, a perspective view of the embodiment of the hydraulically-powered vacuum system illustrated in FIGS. 2A-2C. The system includes a high-speed bent-axis piston motor 307 operatively connected to a positive-displacement blower 308. The system may include a baghouse filtration system 314 connected to the top of the vacuum receiving hopper 315, and an exhaust 316 on top of the baghouse filtration system 314. Vacuum tubing 317 extends from the exhaust 316 to the blower 308. The air blowing out from the blower exits through the muffler 318. A vacuum nozzle tube (not shown) may be attached to an opening 320 in the hopper 315. The system also illustrates the manifold 310, which contains a portion of the hydraulic circuit as illustrated in FIG. 1C, connected to the bent axis piston motor 307.

Figure 4:
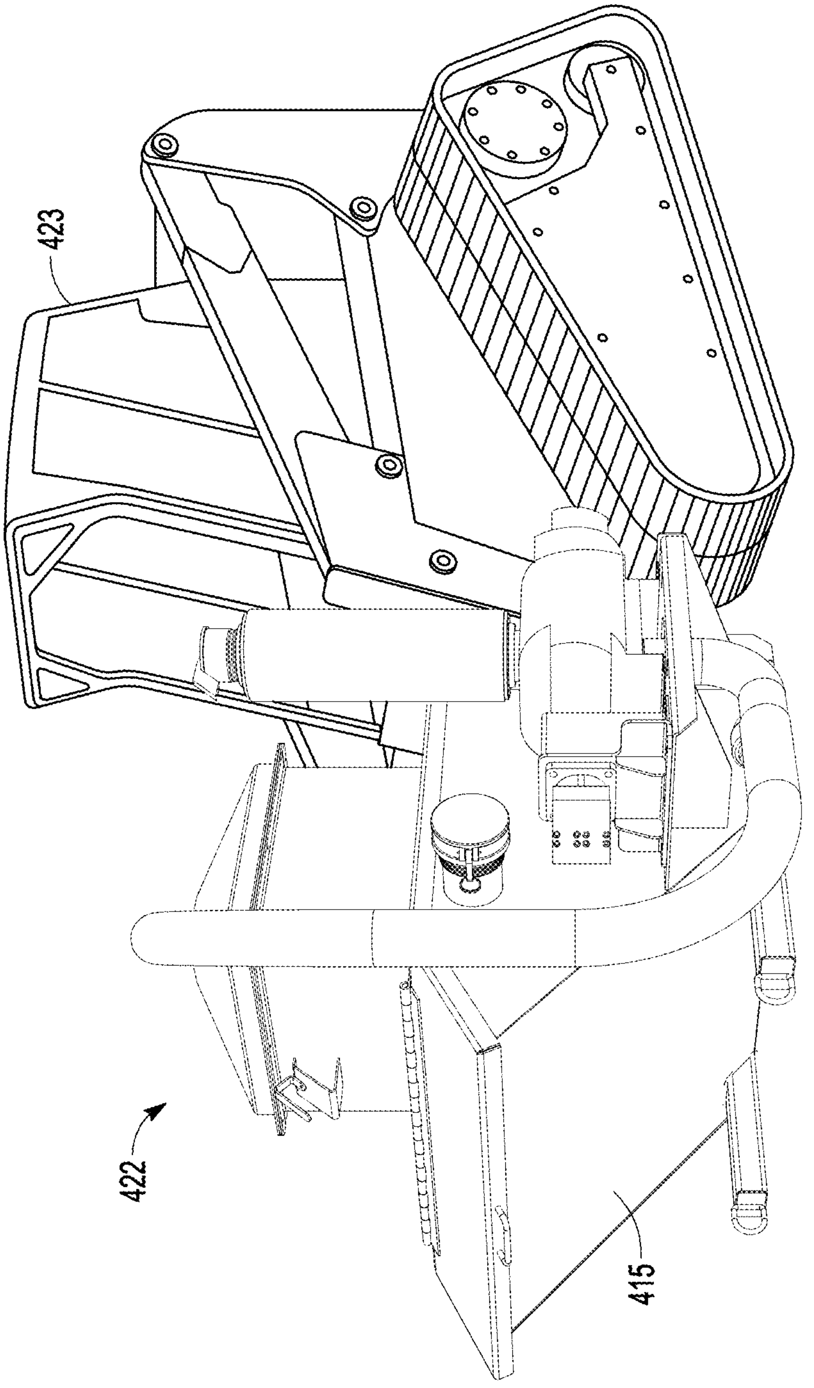
FIG. 4 illustrates, by way of example and not limitation, the embodiment of the hydraulically-powered vacuum system illustrated in FIGS. 2A-2C and FIG. 3 attached to a skid steer.

FIG. 4 illustrates, by way of example and not limitation, the embodiment of the hydraulically-powered vacuum system 422 illustrated in FIGS. 2A-2C and FIG. 3 attached to a skid steer 423. The skid steer 423 may be used to provide the hydraulic power to the vacuum system 422, to transport the vacuum system, and to raise and dump the contents of the hopper 415.

Figure 5:
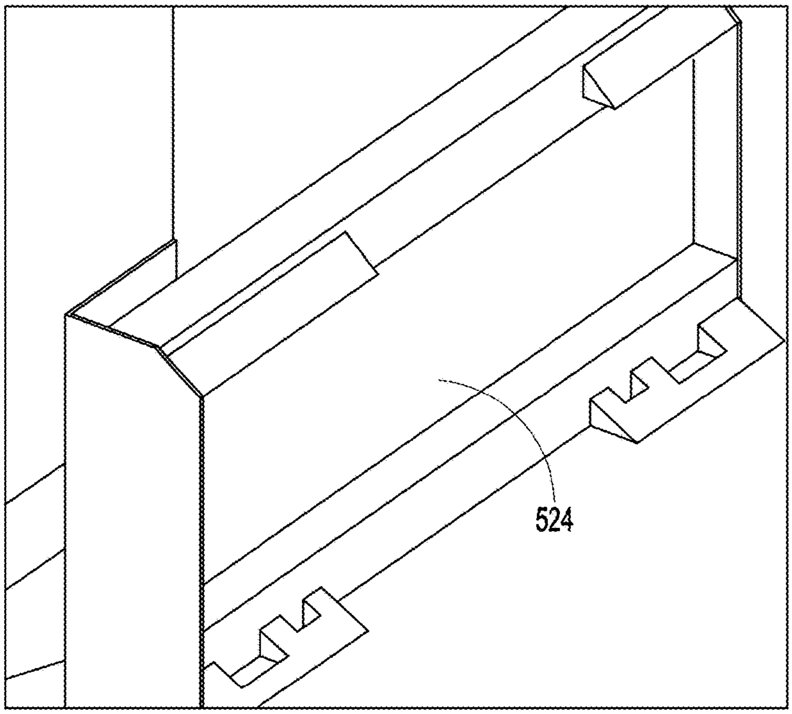
FIG. 5 illustrates, by way of example and not limitation, an embodiment of a quick attach plate for use to attach the hydraulically-powered vacuum system to a skid steer.

FIG. 5 illustrates, by way of example and not limitation, an embodiment of a quick attach plate 524 for use to attach the hydraulically-powered vacuum system to a skid steer. The attachment plate could also be adapted to attach to other type of skid steers or made to attach to a payloader, wheel loader or telehandler.

Figure 6:
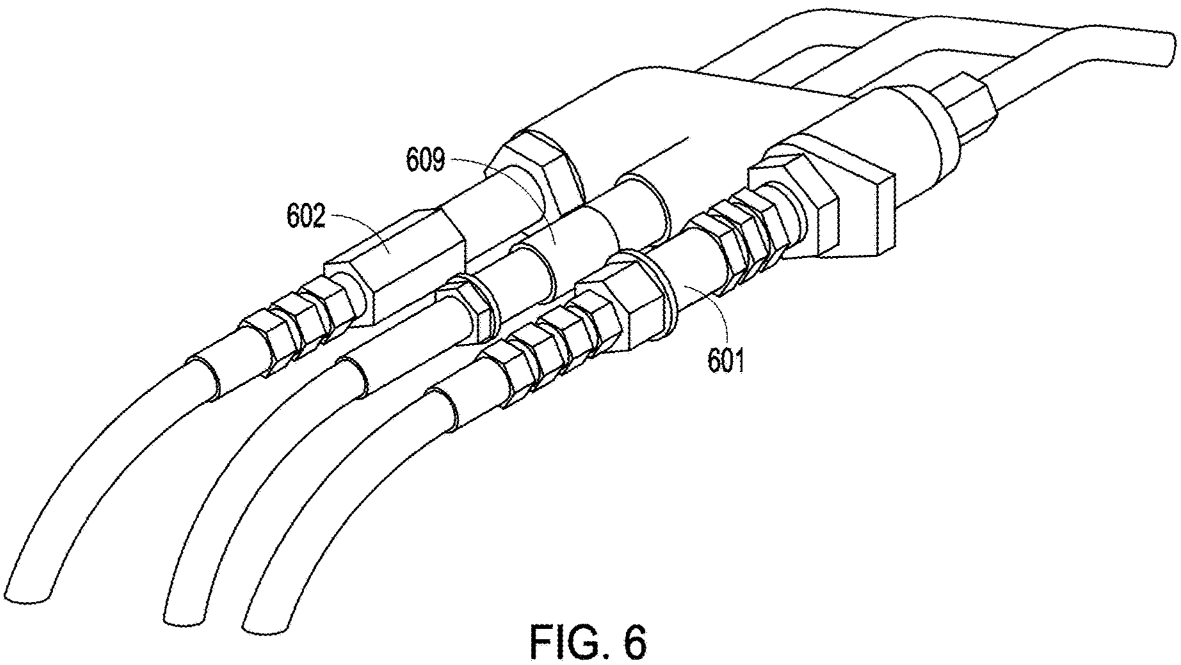
FIG. 6 illustrates, by way of example and not limitation, hydraulic couplings of the vacuum system to the auxiliary hydraulic system of a skid steer, including connections for the pressure line, return line and fluid connection to the case drain.

FIG. 6 illustrates, by way of example and not limitation, hydraulic couplings of the vacuum system to the auxiliary hydraulic system of a skid steer, including connections for the pressure line 601, return line 602 and fluid connection 608 to the case drain. The hydraulics plug into the skid steer by use of hydraulic quick couplers. The case drain port is also required for use with the high speed bent axis piston hydraulic motor drive.

Figure 7:
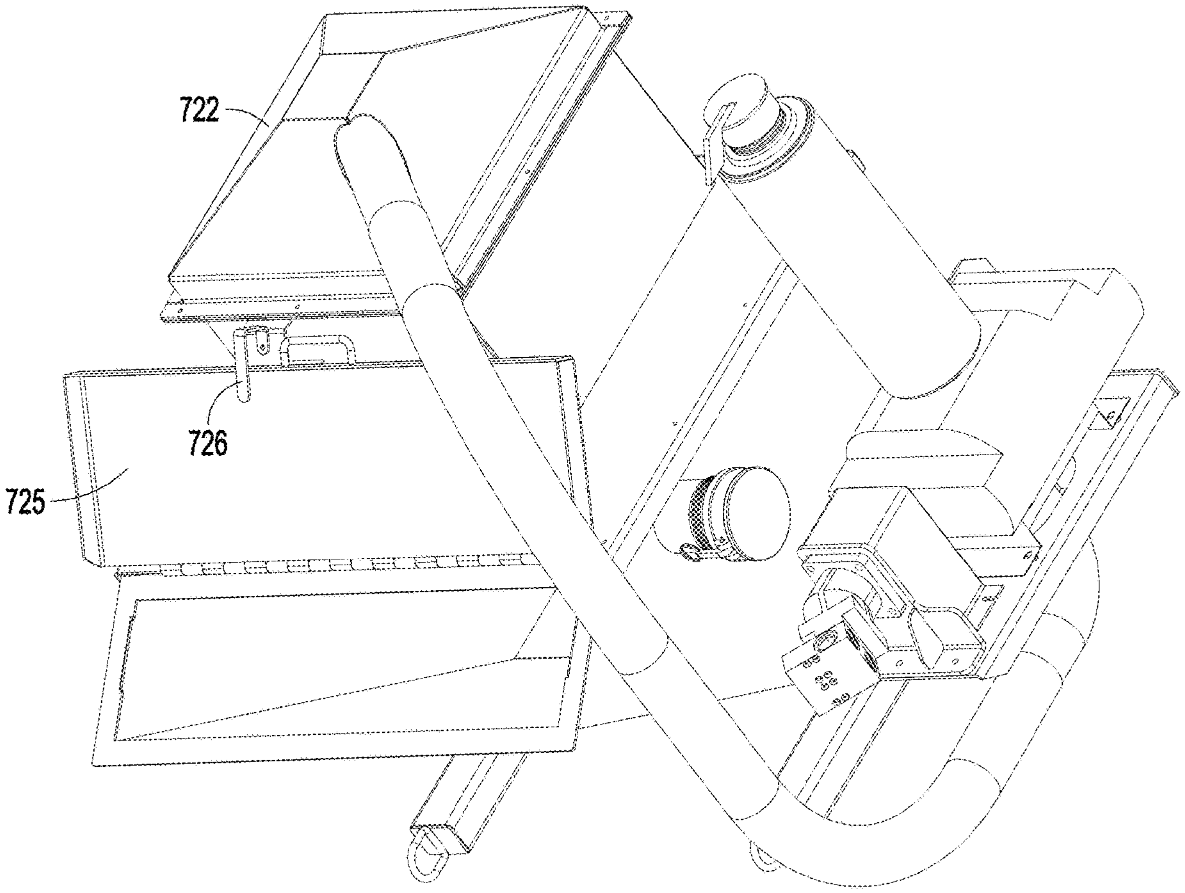
FIG. 7 illustrates, by way of example and not limitation, the hydraulically-powered vacuum system, which may be attached articulated arms (e.g., skid steer) which is not shown, being tipped to dump debris from the hopper.
Figure 8:
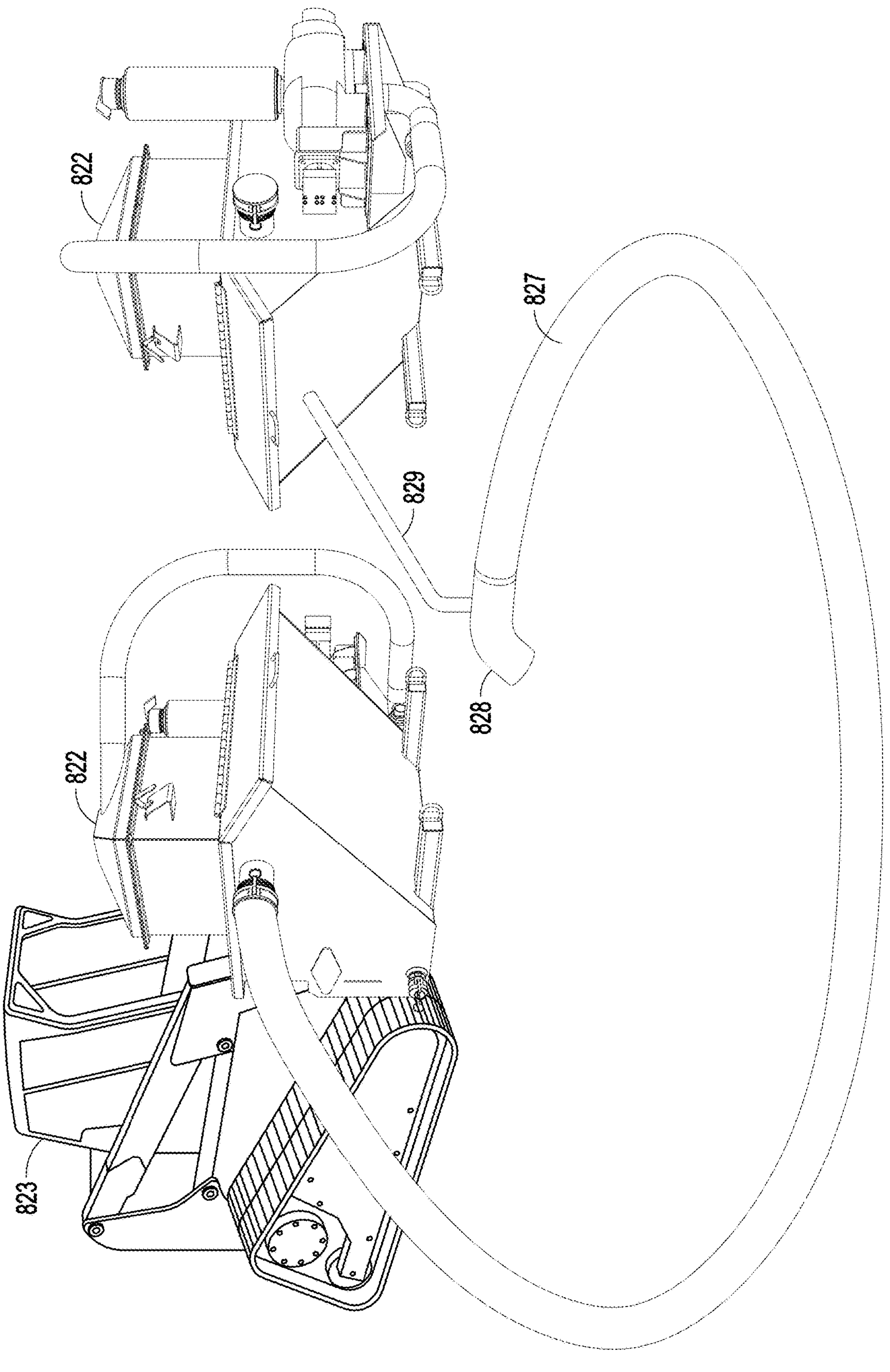
FIG. 8 illustrates, by way of example and not limitation, the hydraulically-powered vacuum system with a vacuum hose and nozzle attached.
Figure 9:
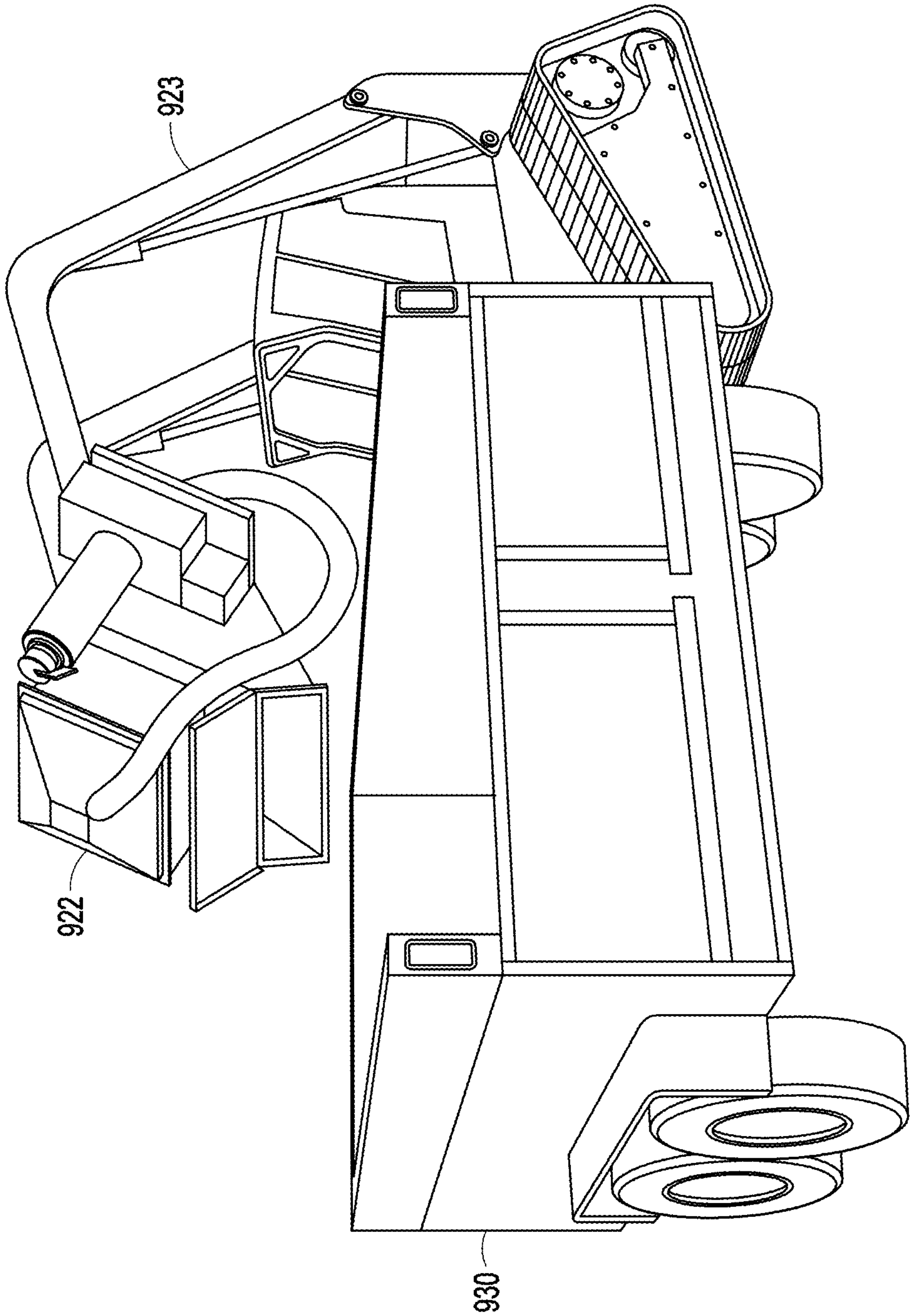
FIG. 9 illustrates, by way of example and not limitation, the hydraulically-powered vacuum system attached to a skid steer, where the vacuum system is tipped to dump debris from the hopper into a trailer.

FIG. 7 illustrates the hydraulically-powered vacuum system 722, which may be attached articulated arms (e.g., skid steer) which is not shown, being tipped to dump debris from the hopper 715. This illustrates a hinged lid 725 held in an open position via a latch 716 to allow the debris to be tipped out of the hopper 715. The lid has a gasketed seal around the periphery to maintain a seal for the vacuum within the vacuum receiving hopper during use. FIG. 8 illustrates, by way of example and not limitation, the hydraulically-powered vacuum system with a vacuum hose and nozzle attached. FIG. 9 illustrates, by way of example and not limitation, the hydraulically-powered vacuum system 922 attached to a skid steer 923, where the vacuum system is tipped to dump debris from the hopper 915 into a trailer 930.

Figure 10:
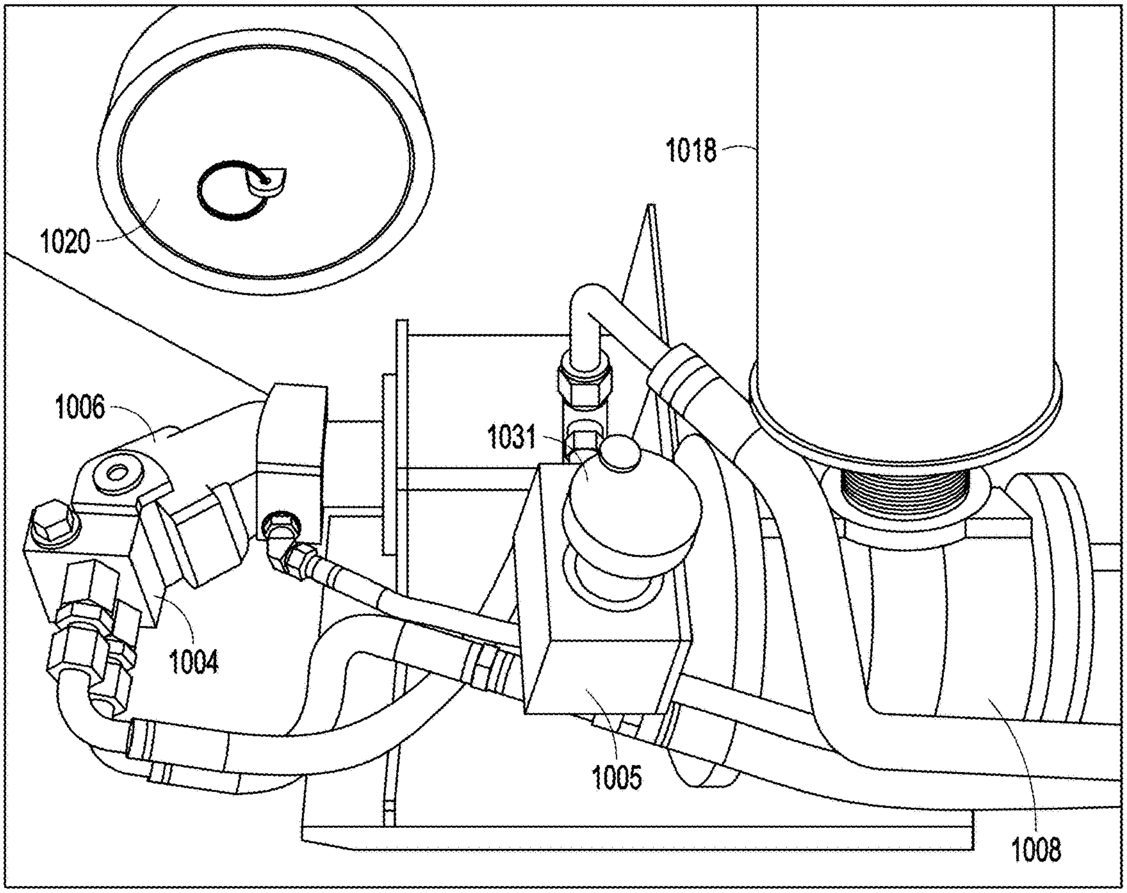
FIG. 10 illustrates another embodiment, by way of example and not limitation, of a hydraulically-powered vacuum system in which the anti-cavitation device is separated from the adjustable control valve, rather than contained within the same manifold.

FIG. 10 illustrates another embodiment, by way of example and not limitation, of a hydraulically-powered vacuum system in which the anti-cavitation device 1004 is separated from the adjustable control valve 1005, rather than contained within the same manifold. The view of FIG. 10 provides a close-up view of the anti-cavitation valve 1004 bolted onto the high speed bent axis piston motor 1007, the adjustable flow control valve 1005 (illustrated as a quarter turn valve that can be manually actuated via a control knob 1031), the positive-displacement blower 1008, muffler 1018 and hopper opening 1020.

Figure 11:
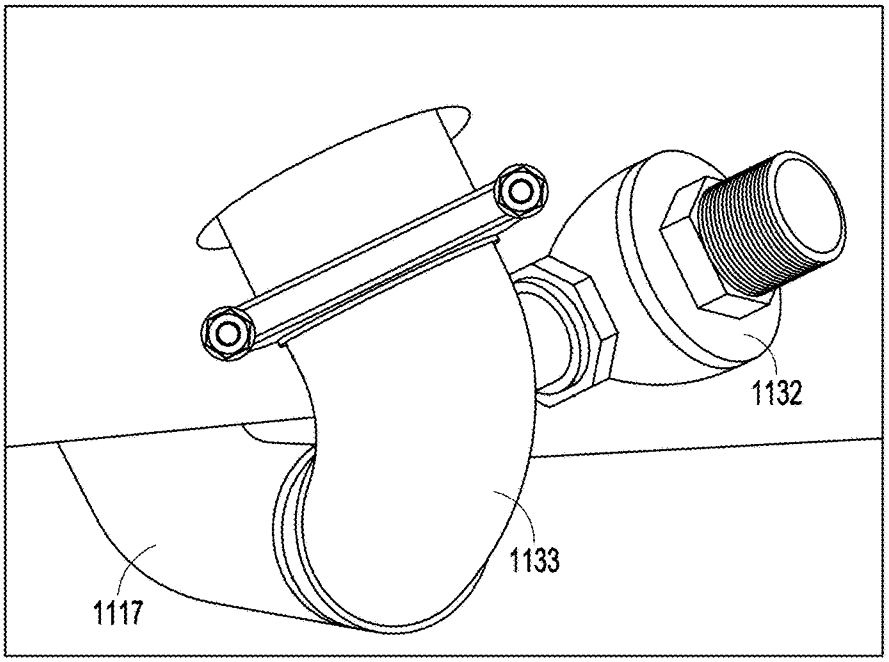
FIG. 11 illustrates, by way of example and not limitation, a vacuum relief valve for the hydraulically-powered vacuum system.

FIG. 11 illustrates, by way of example and not limitation, a vacuum relief valve for the hydraulically-powered vacuum system. The vacuum relief valve 1132 is connected to an elbow fitting 1133 that connects the vacuum tubing 1117 to the positive-displacement blower (not shown in FIG. 10). The vacuum relief valve provides a safety limit on the amount of the vacuum that can be draw in the system. The relief valve can be purchased with different relief settings as an example 11 InHg 13 InHg and so on. For example, the blower may be rated for 15 InHg but the max vacuum may be much less using the vacuum relief valve.

Figure 12A:
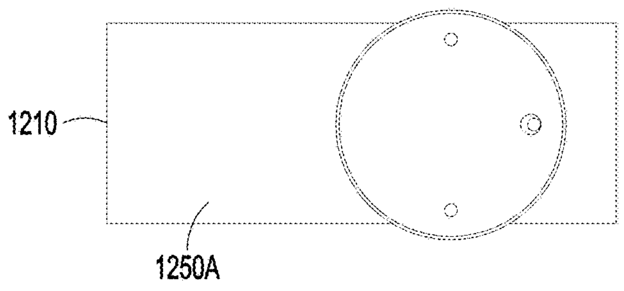
FIGS. 12A-12F illustrate, by way of example and not limitation, various orthographic views of an embodiment of a manifold as illustrated as a schematic in FIG. 1C and as also illustrated in FIG. 3.
Figure 12B:
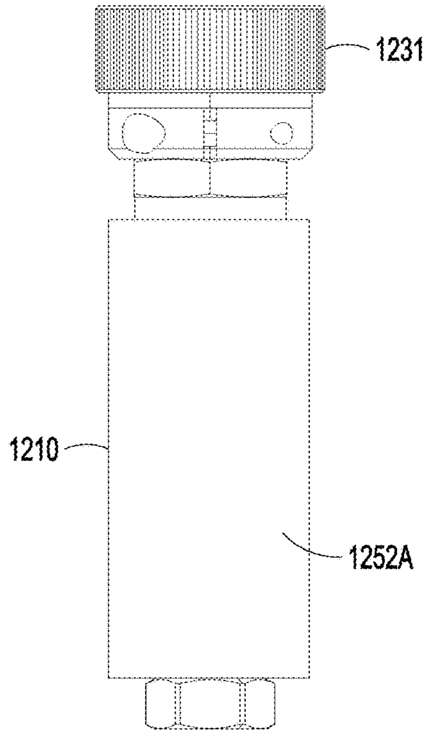
Figure 12C:
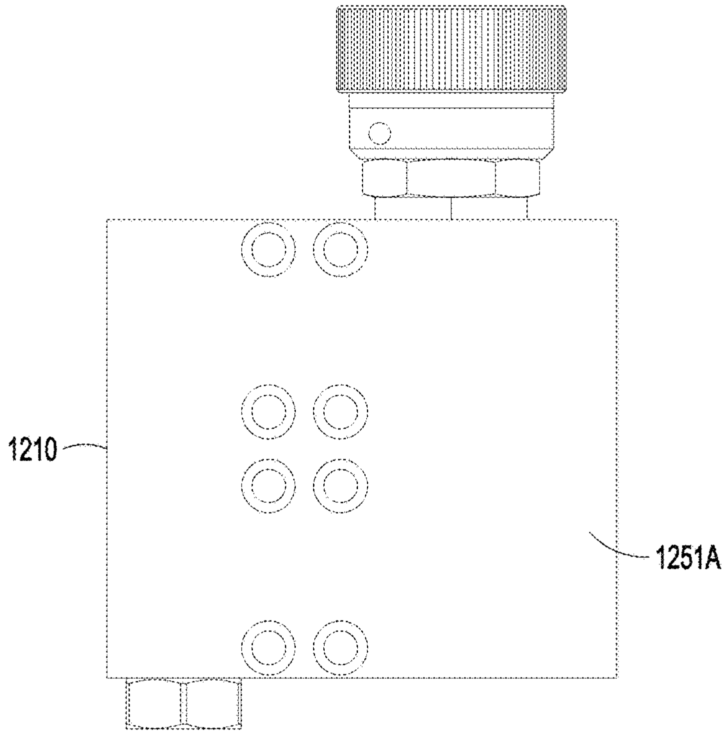
Figure 12D:
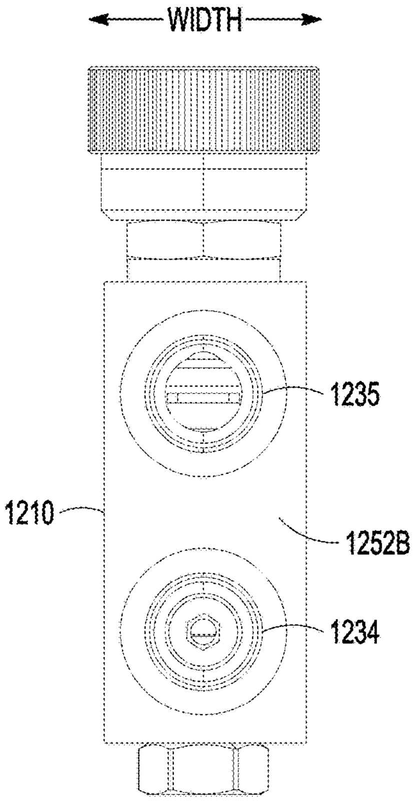
Figure 12E:
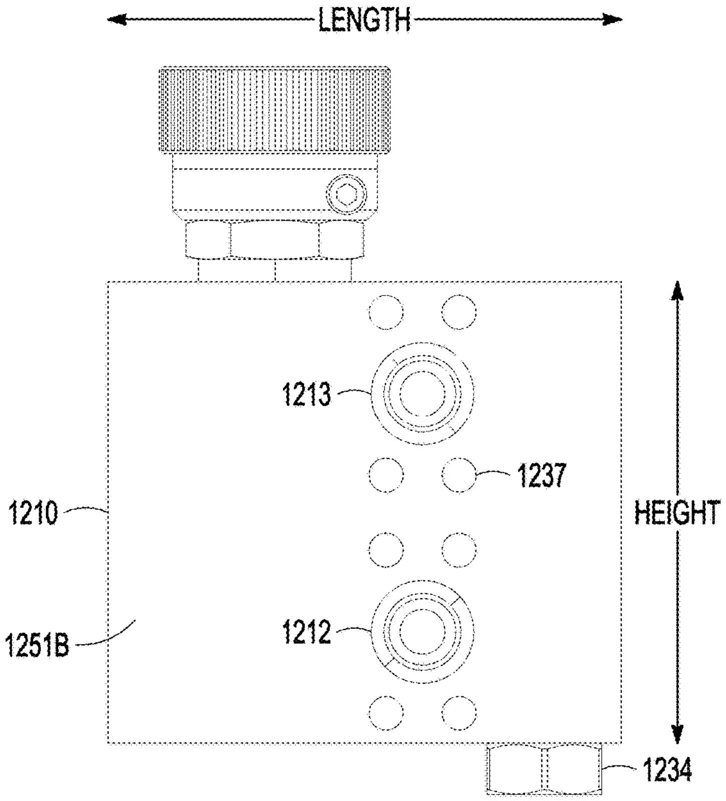
Figure 12F:
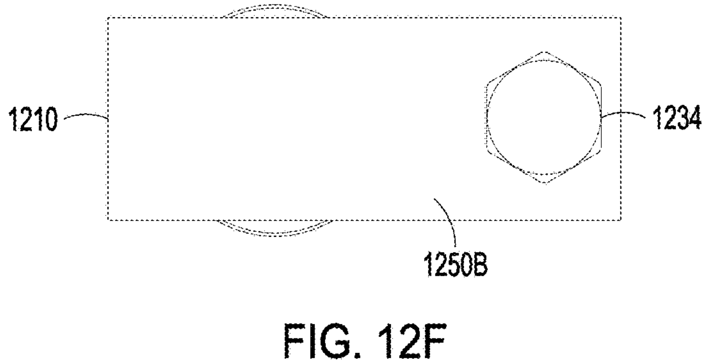

FIGS. 12A-12F illustrate, by way of example and not limitation, various orthographic views of an embodiment of a manifold as illustrated as a schematic in FIG. 1C and as also illustrated in FIG. 3. The manifold may be constructed from a metal such as aluminum. In the illustrated embodiment, the manifold generally has a block-like or rectilinear shape. The top of the manifold 1210 has a knob 1231 which is configured to be use to turn the adjustable flow control valve. The bottom of the manifold 1210 reveals a plug 1234 for the anti-cavitation valve. The illustrated manifold includes an input orifice 1235 and an output orifice 1236, both of which are configured to be connected to hydraulic hoses. The input orifice 1235 is configured for use in receiving an input of hydraulic fluid flow from the hydraulic source, and the output orifice 1236 is configured for use in returning hydraulic flow from the manifold to the hydraulic source. The motor mount 1211 is generally illustrated in FIG. 12E, and also illustrates the motor input orifice 1236 and the motor output orifice 1212 for enabling fluid flow from the manifold into the motor and motor output orifice 1213 for returning fluid flow from the motor. Also illustrated is a pattern 1237 of openings for use to fasten (e.g., insert bolts through openings) the manifold to the motor.

Figure 13B:
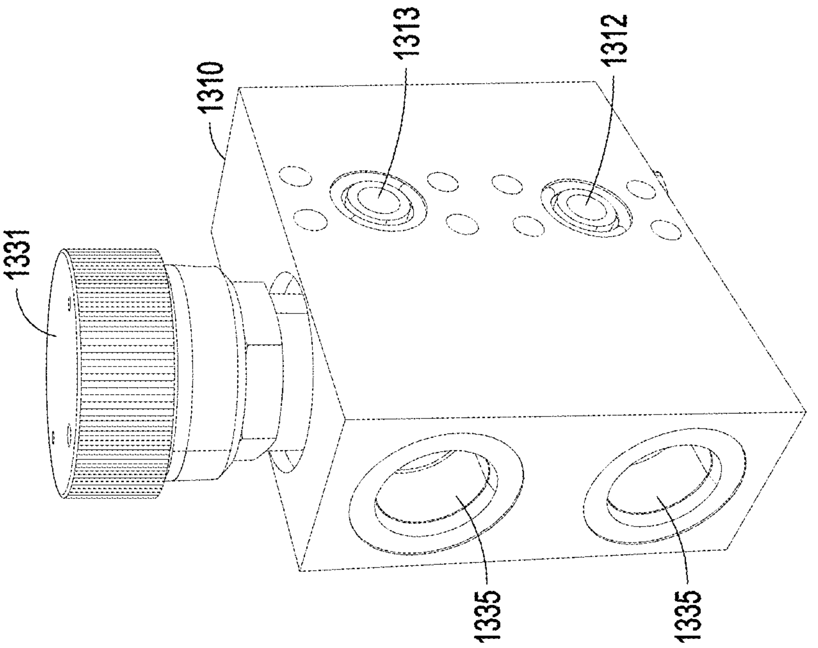
FIGS. 13A-13B illustrate, by way of example and not limitation, perspective views of the embodiment of the manifold illustrated in FIGS. 12A-12F.
Figure 13A:
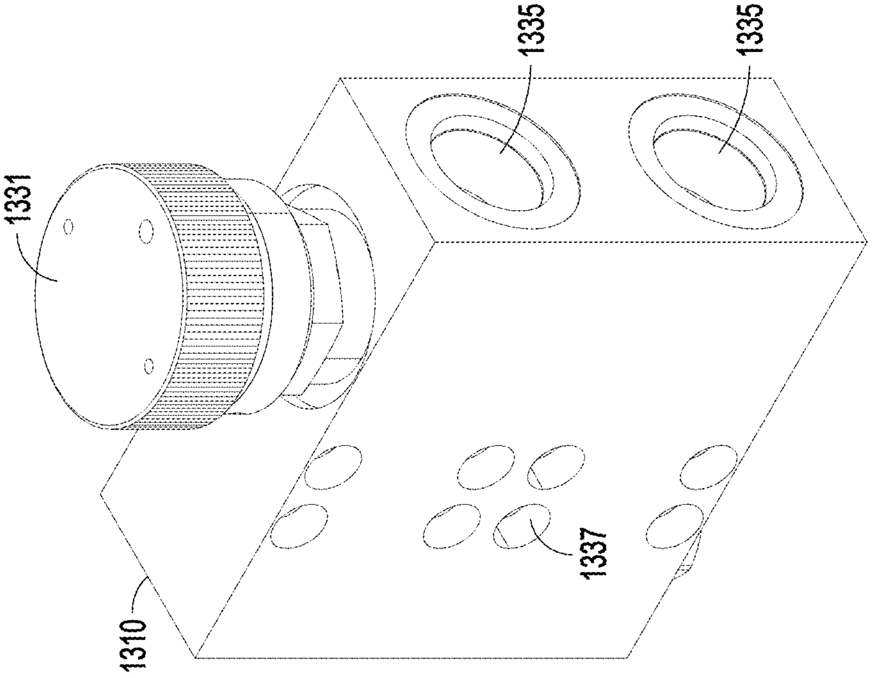

FIGS. 13A-13B illustrate perspective views of the manifold. The illustrated manifold 1310 shows the knob 1331 which is configured to be use to turn the adjustable flow control valve. Also illustrated are the input orifice 1334 and an output orifice 1335, and the pattern 1337 of through-holes used to mount the manifold.

Figure 14:
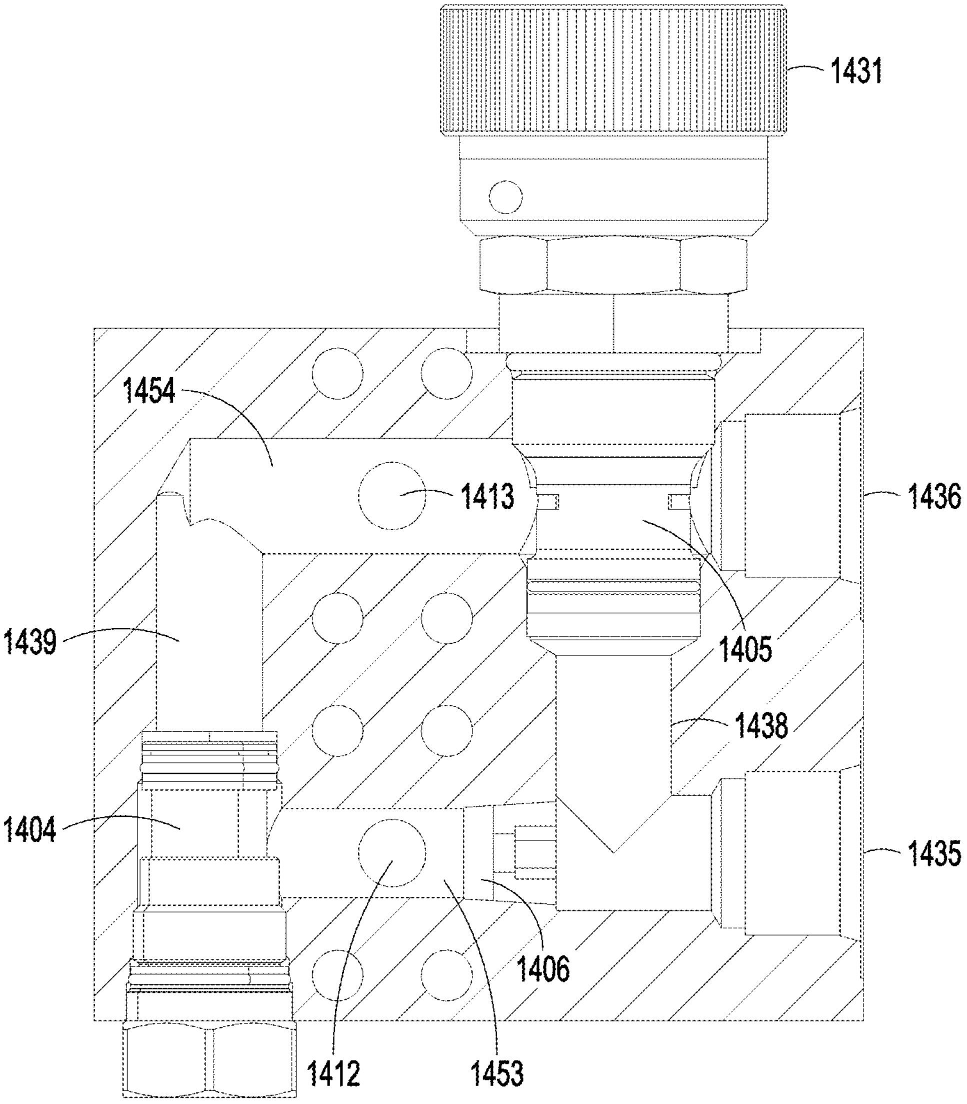
FIG. 14 is a cross-section view along line A-A in FIG. 12A.

FIG. 14 is a cross-section view along line A-A in FIG. 12A. FIG. 14 illustrates the hydraulic passageways including the bypass hydraulic fluid passage 1438 and the anti-cavitation hydraulic fluid passage 1439, the adjustable flow control valve 1405 and knob 1431, and the anti-cavitation valve 1404. The illustration shows the input orifice 1435 and an output orifice 1436, as well as the motor input orifice 1412 and motor output orifice 1413. The pattern 1437 of through-holes used to mount the manifold is also shown.

The hydraulic manifold may be configured to be attached between a hydraulic source and a hydraulic motor. The manifold may include a metal block having six sides and having a height, a length and a width. The metal block may be an aluminum block (e.g., 6061-T6 aluminum). The width may be less than the height and may be less than the length. Opposing top and bottom surfaces 1250A and 1250B have dimensions corresponding to the width and the length. Opposing face surfaces 1251A and 1251B have dimensions corresponding to the length and the height. Opposing side surfaces 1252A and 1252B have dimensions corresponding to the width and the height. The metal block may be formed with a pattern of mounting apertures 1237 extending between the opposing face surfaces. The pattern of mounting apertures is configured to receive fasteners to mount the metal block to the hydraulic motor.

A hydraulic input orifice 1234 and a hydraulic output orifice 1235 may be in one of the opposing side surfaces 1252B. The hydraulic input orifice is configured to be connected to a pressure hydraulic line hose and the hydraulic output orifice is configured to be connected to a return hydraulic line hose. A motor input orifice 1212 and a motor output orifice 1213 may be in one of the opposing face surfaces 1251B and configured to be in fluid communication with the hydraulic motor when the metal block is mounted to the motor.

The metal block may include hydraulic passages, including an input passage 1453 extending at least from the hydraulic input orifice 1435 to the motor input orifice 1412, and an output passage 1454 extending at least from the hydraulic output orifice 1436 to the motor output orifice 1413, a bypass passage 1438 extending between the input passage 1453 and the output passage 1454, and an anti-cavitation passage 1439 extending between the input passage 1453 and the output passage 1454. The input passage 1453 may be parallel to the output passage 1454, the bypass passage 1438 may be parallel to the anti-cavitation passage 1439, and the bypass and anti-cavitation passages may be perpendicular to the input and output passages. The input passage 1453 may include a flow restriction orifice 1406 sized to limit fluid flow to the hydraulic motor to be less than a maximum fluid flow rating of hydraulic motor. The bypass and anti-cavitation passages 1439 and 1435 may be on different sides of the motor input and motor output orifices 1412 and 1413.

The control valve 1405 may be positioned within the bypass passage 1438 and be configured to be opened to enable fluid flow through the bypass passage and to be closed to prevent fluid flow through the bypass passage. The anti-cavitation valve 1404 may be positioned within the anti-cavitation passage 1439 and configured to allow fluid flow from the output passage to the input passage when pressure within the output passage is over a threshold above pressure within the input passage. The control valve may be configured to be manually operated using a knob 1431 attached to the control valve, wherein the knob is positioned over the top surface.

Figure 15B:
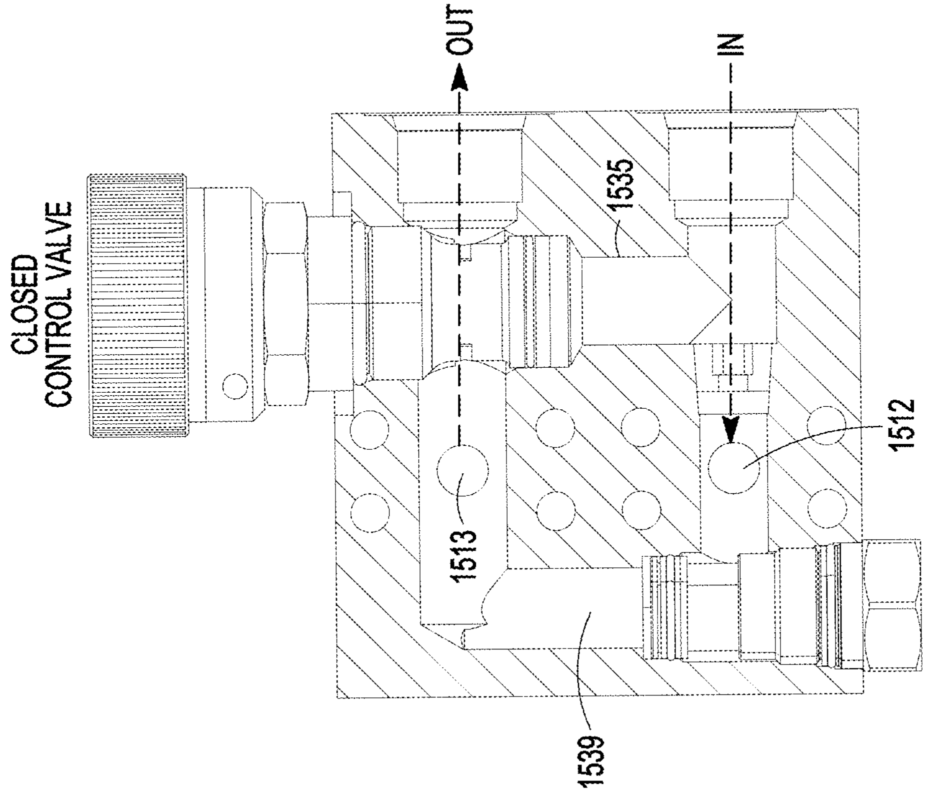
FIG. 15B illustrates hydraulic fluid flow (arrow) out through the motor input orifice and returned through the motor output orifice when the control valve is fully closed.
Figure 15A:
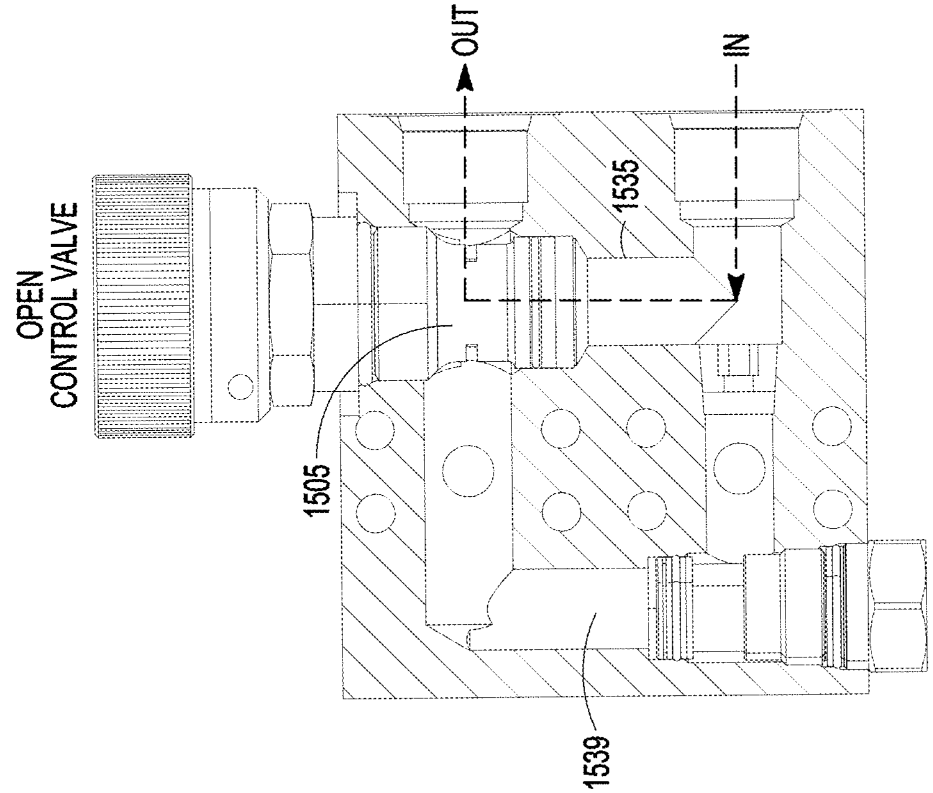
FIG. 15A illustrates hydraulic fluid flow (arrow) through the bypass hydraulic fluid passage when the control valve is fully opened.

FIG. 15A illustrates hydraulic fluid flow (arrow) through the bypass hydraulic fluid passage 1538 when the control valve 1505 is fully opened, and FIG. 15B illustrates hydraulic fluid flow (arrow) out through the motor input orifice 1512 and returned through the motor output orifice 1513 when the control valve 1505 is fully closed. The adjustable flow control valve 1505 may be a quarter turn valve. The valve may be labeled to identify an open (bypass) position in which the motor is off and a closed position in which the motor is operating at a maximum speed, as well as various partially-opened positions. Fluid flows through the anti-cavitation valve 1504 via the anti-cavitation hydraulic fluid passage 1539 to the pressure line 1501 when the motor is coasting to a stop after the valve 1505 is opened.

Figure 16A:
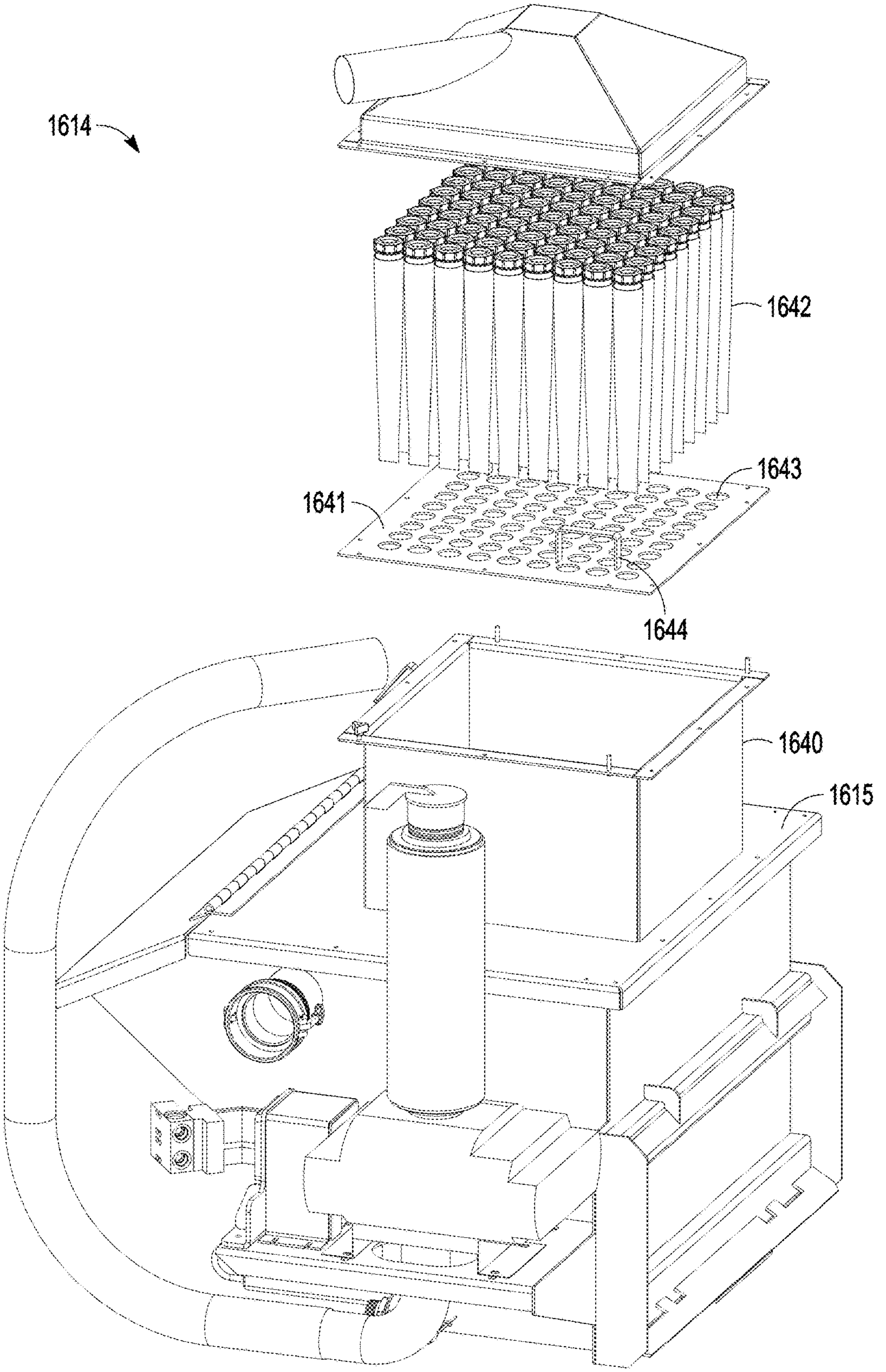
FIGS. 16A-16E illustrate, by way of example and not limitation, components used in a baghouse filtration system.
Figure 16B:
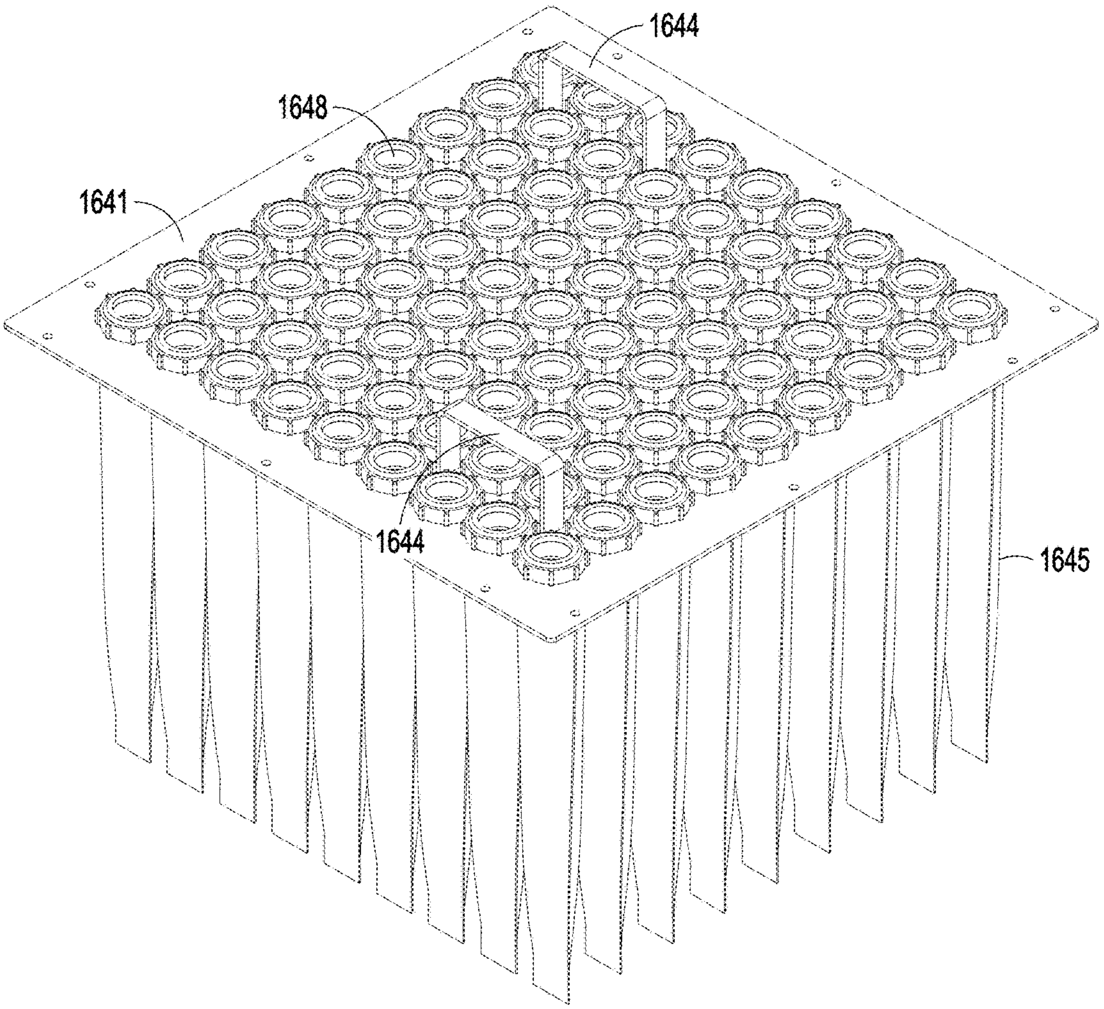
Figure 16C:
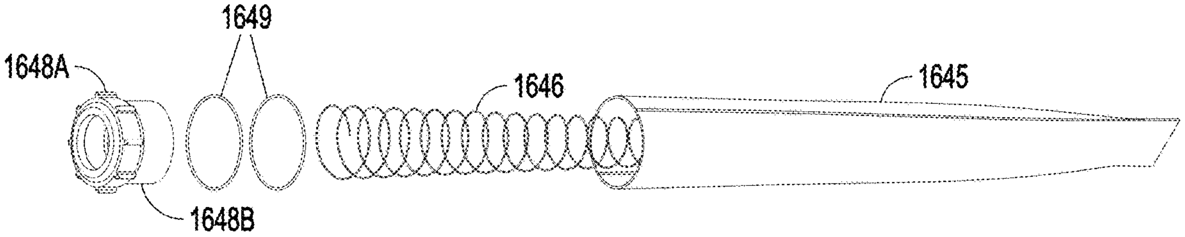
Figure 16D:
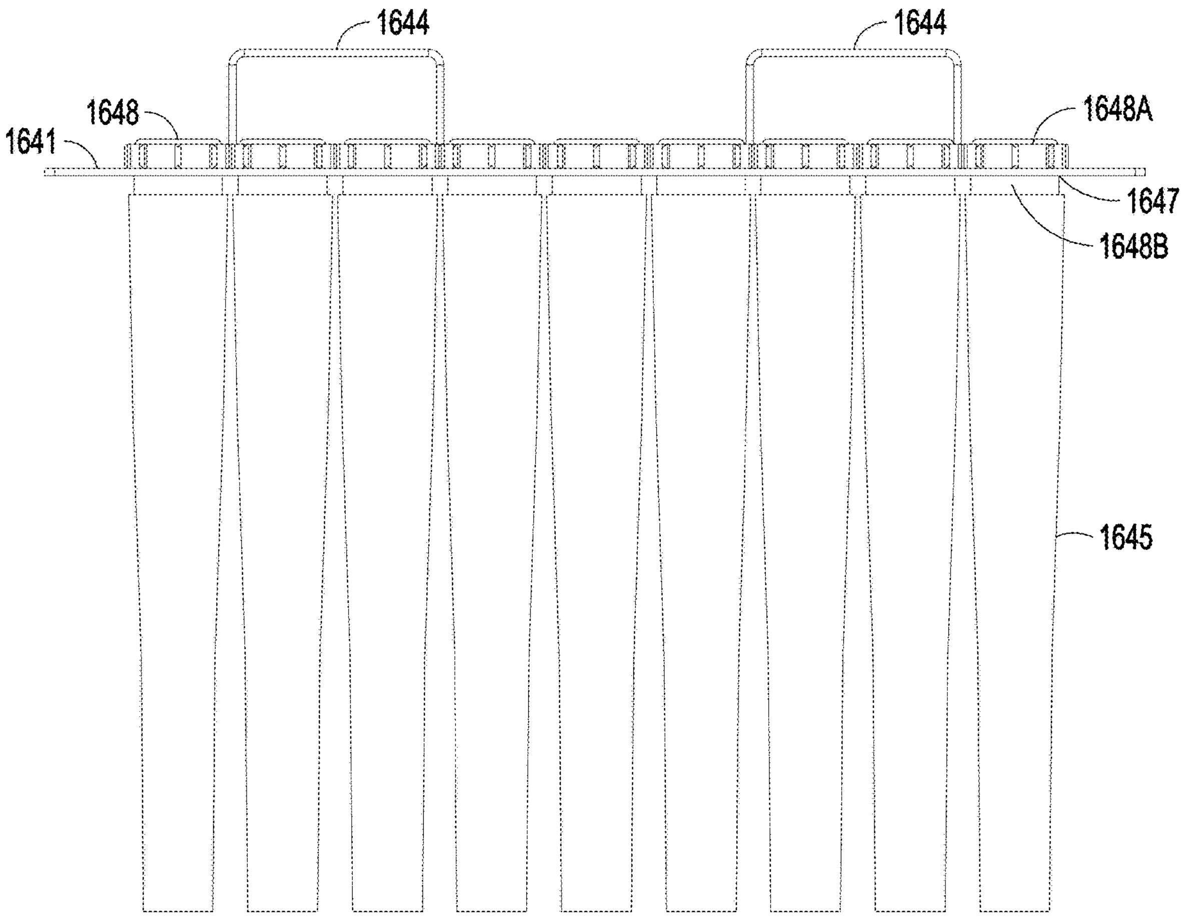
Figure 16E:
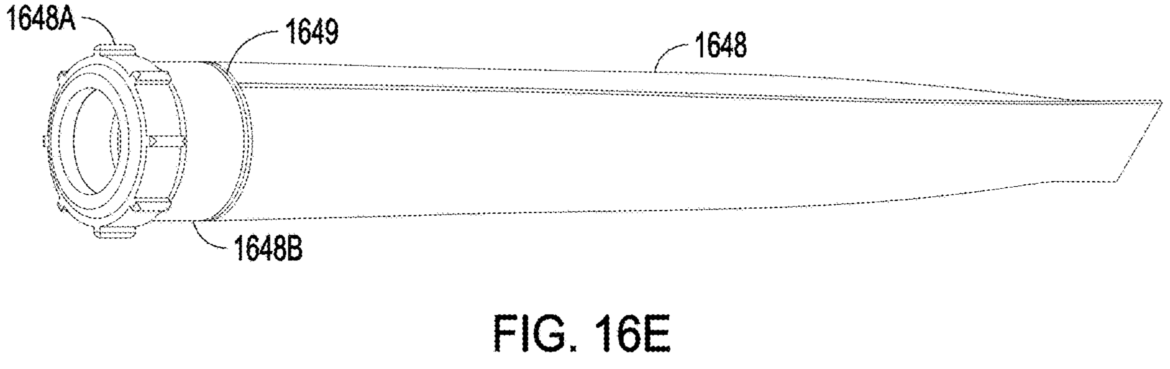

FIGS. 16A-16E illustrate, by way of example and not limitation, components used in a baghouse filtration system 1614. For example, FIG. 16A illustrates an exploded view of the baghouse filtration system 1614. The filtration system 1614 may be attached to a top plate of the hopper 1615. The filtration system 1614 may include a filtration housing 1640, a filtration plate 1641, and a plurality of filters 1642. The filtration plate 1641 has edges that form a seal with the filtration housing 1640, and further includes a plurality of apertures 1643 through which the blower draws air to create the vacuum in the vacuum hopper 1615. The filtration plate 1641 may have handles 1644 to assist with removing the filters from the filtration housing. Each of the filters 1642 include a filter bag 1645 and a flexible frame within the filter bag to generally maintain a shape of the filter during operation. The flexible frame may include a spring 1646. Each of the plurality of filters 1642 have a neck 1647 for use to securely attach the plurality of filters to the plurality of apertures in the filtration plate. Each of the plurality of filters may include a filter head 1648. Each filter head 1648 may have two filter head pieces 1648A and 1648B configured to attach to each other, via a threaded connection, through the aperture and secure the filter head to the filtration plate. For example, a plumbing fitting (such as a spigot and slip joint male trap PVC adapter) may be used to form the head. A pair of O-Rings 1649 may be used to provide a seal between each of the two filter head pieces 1648A and 1648B and the filter plate 1641. The connected filter head pieces form a neck 1647 that fits within the aperture 1643 of the filter plate 1641. Each of the filter head pieces 1648A and 1648B has a central opening through which air is drawn into the return tubing, and the spring is attached to one of the filter head pieces. For example, an adhesive such as Gorilla Glue® may be used to adhere the spring and the fabric filter bag to the bottom filter head piece 1648B. In some embodiments, hose clamps may be used to removably secure the fabric filter bags to the bottom one of the head pieces. Each of the plurality of filters 1642 may have a generally elongated shape hanging down from the filtration plate 1641.

The filters may include removable and replaceable tube sheets over the vacuum receiving hopper, allowing gravity to drop dust and debris back into product when the vacuum is turned off and when the vacuum system is moved, tipped, or otherwise vibrated. For example, a skid steer may lift and dump the hopper which also shakes the filters. This movement and vibration assist in cleaning every time it dumps. In the illustrated embodiment, the filter bags have a 2 inch diameter and are 15 inches long. This design provides a high sheet area exposed to the air, which helps the machine to continue to draw a vacuum during use when they begin to accumulate dust or other debris. Other arrangements, filter dimensions, etc. may be used. Filters are washable (e.g. pressure washer). The sheet may be fabricated from special cloth (e.g., membrane-coated sheets) that repels dust. The plurality of filters may include fabric treated to repel oil and water. By way of example and not limitation, the fabric bags may be fabricated using glazed Teflon® (The Chemours Company) on felt, felt coated with Kleentes (Testori USA, Inc.) for a more water repellant design, or felt with a Tetratex® membrane (Donaldson Membranes). The filters are configured and arranged to rub against each other when the machine lifts and tips the vacuum system to thereby knock debris off of the filters during operation. The filters are arranged in an array of columns and rows. The particular design may differ. For example, some designs may provide a more compact spacing my offsetting adjacent rows. There are multiple filtration options to protect the positive displacement blower from damage, by keeping the dust or product from going into and through the blower and back into atmosphere.

Figure 17:
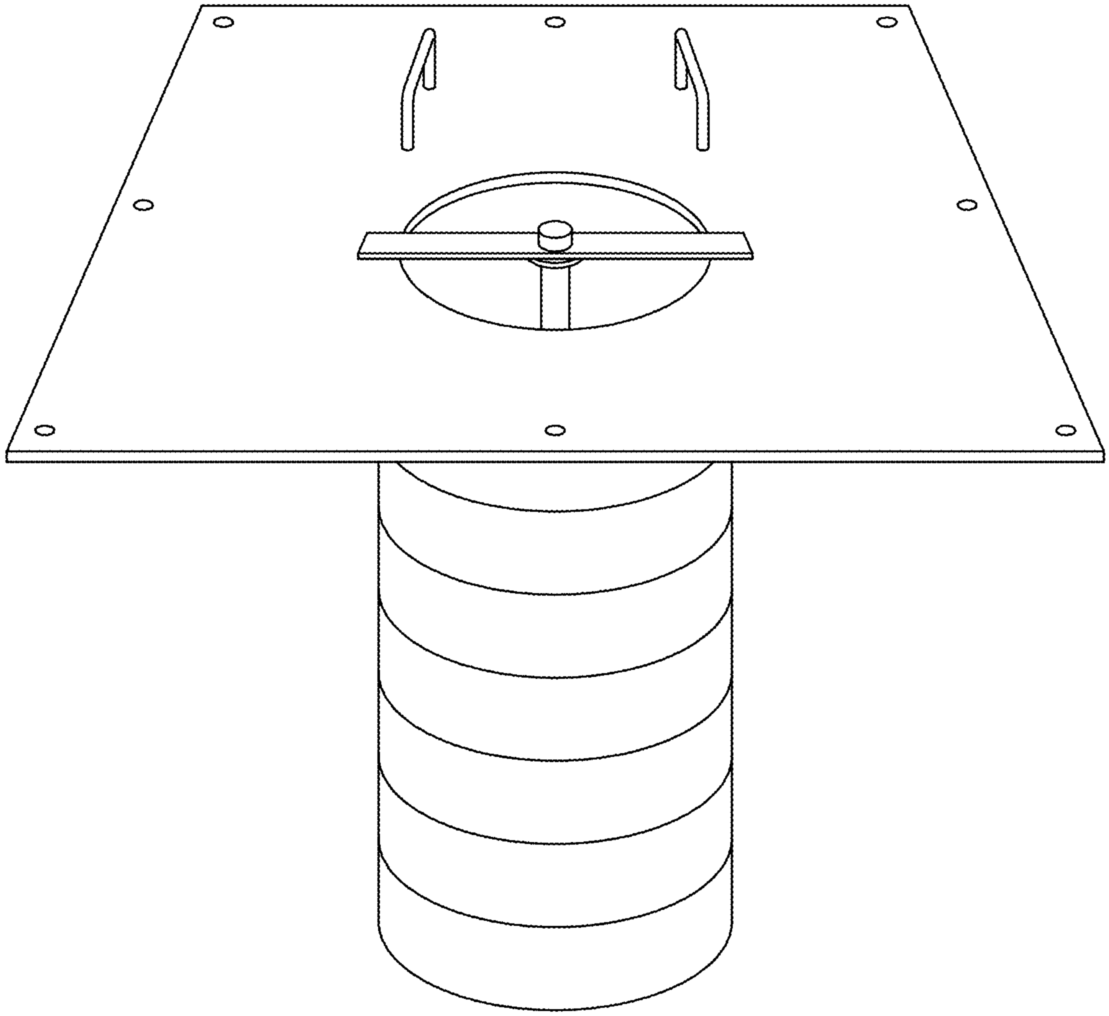
FIG. 17 illustrates, by way of example and not limitation, a filter canister for an embodiment of the hydraulically-powered vacuum system.

Many types of filter systems may be used with the illustrated vacuum system. For example, the system may be designed to use mechanical, pleated air filters, such as HEPA (high-efficiency particulate air) filters. Other filter designs may include a cartridge filter, a screen or even a furnace filter. For example, FIG. 17 illustrates a filter canister for an embodiment of the hydraulically-powered vacuum system.

The skid steer vacuum attachment may be used for a variety of wet/dry vacuuming work. By way of example and not limitation, the skid steer vacuum attachment may be used for:

landscape rock and wood mulch removal;
flood cleanup;
duct cleaning;
sand blasting or grit cleanup;
potholing and footing construction;
stump grinding cleanup;
feed clean up inside or outside of barns;
buried utility access;
valve box and manhole clean-out;
rain gutter cleaning;
pit clean-out;
small grain and grain dust cleanup;
DDG (Distillers grain) and wet cake cleanup;
making of nice loose potting soil out of hard packed black soil;
underground rodent removal;
golf course sand trap clean-out;
salvage work/derailments or tipped truck spillage;
pothole or crack cleaning of either concrete or asphalt roads or driveways;
garbage cleanup/under outdoor bleachers etc.;
roofing removal of rock;
tile clean out;
storm sewer clean-out;
clean up of broken glass after storms or rioting;
leaf and compost clean up;
emergency evacuation of hazardous gases, smoke and dust;
egress window clean-out;
sand box removal;
clean out of raised flower beds;
clean up and trench making of basements getting in floor drain tile installed;
wet or dry blown in insulation removal;
wood shaving cleanup; and
clean-up of remaining liquid after poultry barn disinfecting.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventor also has contemplated examples in which only those elements shown or described are provided. Moreover, the present inventor has also contemplate examples using combinations or permutations of those elements shown or described.

The above description is intended to be illustrative, and not restrictive. For example, the above-described examples (or one or more aspects thereof) may be used in combination with each other. Other embodiments may be used, such as by one of ordinary skill in the art upon reviewing the above description. The scope of the invention should be determined with reference to the appended claims, along with the full scope of equivalents to which such claims are entitled.

What is claimed is:

1. A hydraulic implement for attachment to a hydraulic system having a pressure line and a return line and for control by an operator, wherein the hydraulic implement includes:

a motor operably connected between the pressure line and the return line and to rotate a shaft when hydraulic fluid flows from the pressure line through the motor to the return line;

an operator-controlled ramping circuit configured to enable an operator to ramp up the motor to operating speed and to ramp down the motor to coast to a stop, the ramping circuit including an anti-cavitation valve connected in parallel across the motor between the pressure line and the return line, wherein the anti-cavitation valve is configured to allow hydraulic fluid flow from the return line to the pressure line when pressure within the return line is over a threshold above pressure within the pressure line; and an operator-controlled adjustable flow control valve connected in parallel across the motor between the pressure line and the return line, wherein a hand-operated actuator is mechanically connected to transmit force to the adjustable flow control valve for use by the operator to manually adjust the adjustable flow control valve into a fully closed position, various partially-opened positions, and a fully open position; and hydraulic quick couplers for connecting the hydraulic implement to the hydraulic system.

2. The hydraulic implement of claim 1, further comprising a fluid connection between the motor and a case drain line of the hydraulic system.

3. The hydraulic implement of claim 1, further comprising a quick attachment plate for connection to a machine that includes the hydraulic system.

4. The hydraulic implement of claim 1, wherein the motor is a high speed bent axis piston hydraulic motor drive.

5. The hydraulic implement of claim 1, further comprising a blower, wherein the motor is operably connected to the blower.

6. The hydraulic implement of claim 5, wherein the hydraulic implement is configured to operate as a vacuum system, the hydraulic implement further including a vacuum receiving hopper, the blower being operatively connected to the vacuum receiving hopper to draw a vacuum in the vacuum receiving hopper.

7. The hydraulic implement of claim 6, wherein the hydraulic implement includes tubing connected to the blower and configured for the blower to draw the vacuum through a top of the vacuum receiving hopper.

8. The hydraulic implement of claim 7, further comprising a baghouse filtration system connected to the top of the vacuum receiving hopper, wherein the blower and tubing are configured to draw the vacuum from the top of the vacuum receiving hopper through the baghouse filtration system, and the baghouse filtration system is configured to filter dust and debris from returning with air being drawn through the tubing to the blower.

9. The hydraulic implement of claim 8, wherein the baghouse filtration includes a plurality of filters, each of the filters including a filter bag and a spring within the filter bag to generally maintain a shape of the filter during operation.

10. The hydraulic implement of claim 9, wherein each of the plurality of filters have a neck, and the baghouse filtration includes a filter plate having a plurality of apertures configured to receive the plurality of filters, respectively, each of the plurality of filters being held in plate at the neck of the filter, and where air is drawn through the plurality of filters in the plurality of apertures through the tubing to the blower.

11. The hydraulic implement of claim 10, wherein each of the plurality of filter bags has a diameter of about 2 inches and a length of about 15 inches.

12. A method for operating a hydraulic implement that is attached to a hydraulic system having a pressure line and a return line and for control by an operator, wherein the hydraulic implement includes a motor operably connected between the pressure line and the return line and to operate to rotate a shaft when hydraulic fluid flows from the pressure line through the motor to the return line, and further includes an operator-controlled ramping circuit configured to enable an operator to ramp up the motor to operating speed and to ramp down the motor to coast to a stop, the ramping circuit including an anti-cavitation valve connected in parallel across the motor between the pressure line and the return line, and an operator-controlled adjustable flow control valve connected in parallel across the motor between the pressure line and the return line, wherein the anti-cavitation valve is configured to allow hydraulic fluid flow from the return line to the pressure line when pressure within the return line is over a threshold above pressure within the pressure line, and a hand-operated actuator is mechanically connected to transmit force to the adjustable flow control valve for use by the operator to manually adjust the adjustable flow control valve into a fully closed position, various partially-opened positions, and a fully open position, wherein the method comprises:

connecting the hydraulic implement to the hydraulic system using hydraulic quick couplers;

engaging the hydraulic system to cause fluid to flow from the pressure line through an open adjustable flow control valve to the return line; and at least partially closing the adjustable flow control valve by manually adjusting the hand-operated actuator to divert at least some hydraulic fluid flow from the pressure line through the motor to the return line.

13. The method of claim 12, further comprising, after at least partially closing the adjust control valve, fully closing the adjustable flow control valve to divert all fluid flow from the pressure line through the motor to the return line.

14. The method of claim 13, further comprising stopping the motor from rotating by reopening the adjustable flow control valve to cause fluid to bypass the motor flowing from the pressure line to the return line, wherein fluid flows from the return line through the anti-cavitation valve to the pressure line when the motor coasts to a stop after the adjustable flow control valve is opened.

15. A hydraulic manifold configured to be attached between a hydraulic source and a hydraulic motor, wherein the manifold comprises:

a metal block having six sides and having a height, a length and a width, wherein the width is less than the height and is less than the length, wherein:

opposing top and bottom surfaces have dimensions corresponding to the width and the length;

opposing face surfaces have dimensions corresponding to the length and the height; and opposing side surfaces have dimensions corresponding to the width and the height;

the metal block having a hydraulic input orifice and a hydraulic output orifice in one of the opposing side surfaces, wherein the hydraulic input orifice is configured to be connected to a pressure hydraulic line hose and the hydraulic output orifice is configured to be connected to a return hydraulic line hose;

the metal block having a motor input orifice and a motor output orifice in one of the opposing face surfaces and configured to be in fluid communication with the hydraulic motor when the metal block is mounted to the motor;

the metal block having hydraulic passages including:

an input passage extending at least from the hydraulic input orifice to the motor input orifice, and an output passage extending at least from the hydraulic output orifice to the motor output orifice;

a bypass passage extending between the input passage and the output passage; and an anti-cavitation passage extending between the input passage and the output passage, an operator-controlled ramping circuit configured to enable an operator to ramp up the motor to operating speed and to ramp down the motor to coast to a stop, the ramping circuit including:

an operator-controlled control valve within the bypass passage, wherein a hand-operated actuator is mechanically connected to transmit force to the control valve for use by the operator to manually adjust the control valve to be fully opened to enable fluid flow through the bypass passage, to be closed to prevent fluid flow through the bypass passage, and to be partially-opened in various partially-opened positions; and an anti-cavitation valve within the anti-cavitation passage configured to allow fluid flow from the output passage to the input passage when pressure within the output passage is over a threshold above pressure within the input passage.

16. The hydraulic manifold of claim 15, wherein the metal block is formed with a pattern of mounting apertures extending between the opposing face surfaces, wherein the pattern of mounting apertures is configured to receive fasteners to mount the metal block to the hydraulic motor.

17. The hydraulic manifold of claim 15, wherein the input passage is parallel to the output passage, the bypass passage is parallel to the anti-cavitation passage, and the bypass and anti-cavitation passages are perpendicular to the input and output passages.

18. The hydraulic manifold of claim 15, wherein the input passage includes a flow restriction orifice, and the flow restriction orifice is sized to:

limit fluid flow to the hydraulic motor to be less than a maximum fluid flow rating of hydraulic motor; or limit fluid flow to limit a maximum operating speed for a component to be driven by the hydraulic motor.

19. The hydraulic manifold of claim 15, wherein the bypass and anti-cavitation passages are on different sides of the motor input and motor output orifices.

20. The hydraulic manifold of claim 15, wherein the hand-operated actuator is positioned outside of the metal block over the top surface.

* * * * *